United States Patent
Guimond

(10) Patent No.: US 9,429,467 B2
(45) Date of Patent: Aug. 30, 2016

(54) SYSTEM FOR NON-CONTACT OPTICAL-POWER MEASUREMENT

(71) Applicant: Lockheed Martin Corporation, Bethesda, MD (US)

(72) Inventor: Stephen J. Guimond, Kingston, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/683,068

(22) Filed: Apr. 9, 2015

(65) Prior Publication Data

US 2015/0292938 A1 Oct. 15, 2015

Related U.S. Application Data

(60) Provisional application No. 61/978,736, filed on Apr. 11, 2014.

(51) Int. Cl.
| | | |
|---|---|---|
| *G01J 1/02* | (2006.01) | |
| *G01J 1/42* | (2006.01) | |
| *G02B 6/024* | (2006.01) | |
| *G02B 6/036* | (2006.01) | |
| *G02B 6/028* | (2006.01) | |
| *G01J 1/04* | (2006.01) | |

(52) U.S. Cl.
CPC ............ *G01J 1/0295* (2013.01); *G01J 1/0425* (2013.01); *G01J 1/0429* (2013.01); *G01J 1/4228* (2013.01); *G01J 1/4257* (2013.01); *G02B 6/024* (2013.01); *G02B 6/0283* (2013.01); *G02B 6/03622* (2013.01)

(58) Field of Classification Search
CPC . G02B 6/024; G02B 6/0283; G02B 6/03622
See application file for complete search history.

(56) References Cited

U.S. PATENT DOCUMENTS

| | | | |
|---|---|---|---|
| 3,728,117 A | | 4/1973 | Heidenhain et al. |
| 4,313,648 A | | 2/1982 | Yano et al. |
| 4,575,181 A | | 3/1986 | Ishikawa |
| 4,586,783 A | | 5/1986 | Campbell et al. |
| 4,784,452 A | * | 11/1988 | Hodge ................. G02B 6/2852 359/900 |
| 4,797,843 A | * | 1/1989 | Falk ........................ G06E 1/065 708/191 |
| 4,824,199 A | | 4/1989 | Uken |

(Continued)

OTHER PUBLICATIONS

"PCT Search Report/Written Opinion for related PCT/US2015/025204 application, mailed Jul. 20, 2015, 14 pages."

(Continued)

*Primary Examiner* — Peter Radkowski
(74) *Attorney, Agent, or Firm* — Charles A. Lemaire; Jonathan M. Rixen; Lemaire Patent Law Firm, P.L.L.C.

(57) ABSTRACT

The present invention provides methods and systems for measuring optical power that require neither alterations to the optical fiber nor physical contact with the optical fiber, the system including an optical fiber configured to propagate an optical signal, wherein the optical fiber includes a core and at least a first cladding layer, wherein a portion of the optical signal scatters out of the optical fiber along a length of the optical fiber to form scattered fiber light; a detector system configured to receive the scattered fiber light along the length of the optical fiber and to output a detection signal based on the received scattered fiber light; and a processor configured to receive the detection signal and to determine a power value of the optical signal based on the received detection signal.

20 Claims, 10 Drawing Sheets

(56) References Cited

U.S. PATENT DOCUMENTS

| | | | |
|---|---|---|---|
| 4,852,117 A | 7/1989 | Po | |
| 4,894,127 A | 1/1990 | Wong et al. | |
| 4,895,790 A | 1/1990 | Swanson et al. | |
| 4,898,444 A * | 2/1990 | Grimes | G02B 6/2852 385/31 |
| 5,015,058 A | 5/1991 | Thorncraft et al. | |
| 5,136,818 A | 8/1992 | Bramson | |
| 5,319,195 A | 6/1994 | Jones et al. | |
| 5,336,366 A | 8/1994 | Cain et al. | |
| 5,483,610 A | 1/1996 | Cox | |
| 5,661,835 A | 8/1997 | Kato et al. | |
| 5,694,114 A | 12/1997 | Udd | |
| 5,812,307 A | 9/1998 | Naganuma | |
| 5,832,156 A * | 11/1998 | Strasser | G01J 3/1895 385/48 |
| 5,850,302 A * | 12/1998 | Strasser | G01J 3/1895 398/83 |
| 5,898,715 A | 4/1999 | LeGrange et al. | |
| 5,901,260 A | 5/1999 | Braun et al. | |
| 5,907,436 A | 5/1999 | Perry et al. | |
| 5,933,271 A | 8/1999 | Waarts et al. | |
| 6,097,863 A | 8/2000 | Chowdhury | |
| 6,167,177 A | 12/2000 | Sandstrom et al. | |
| 6,192,062 B1 | 2/2001 | Sanchez-Rubio et al. | |
| 6,208,679 B1 | 3/2001 | Sanchez-Rubio et al. | |
| 6,212,310 B1 | 4/2001 | Waarts et al. | |
| 6,411,428 B1 | 6/2002 | Lee | |
| 6,424,663 B1 * | 7/2002 | Fidric | H01S 3/1301 372/6 |
| 6,428,217 B1 | 8/2002 | Giltner | |
| 6,535,671 B1 * | 3/2003 | Poole | G02B 6/2852 385/32 |
| 6,611,645 B2 * | 8/2003 | Aleksoff | G02B 6/02095 385/48 |
| 6,652,158 B2 | 11/2003 | Bartur et al. | |
| 6,678,211 B2 | 1/2004 | Vakoc | |
| 6,690,857 B2 * | 2/2004 | Zhao | G02B 6/12007 385/15 |
| 6,744,948 B1 * | 6/2004 | Pi | G02B 6/2826 385/28 |
| 6,744,950 B2 * | 6/2004 | Aleksoff | G02B 6/02095 385/10 |
| 6,822,796 B2 | 11/2004 | Takada et al. | |
| 6,871,025 B2 | 3/2005 | Maleki et al. | |
| 6,905,627 B2 | 6/2005 | Wei et al. | |
| 6,958,859 B2 | 10/2005 | Hoose et al. | |
| 6,969,205 B2 | 11/2005 | Duesterberg et al. | |
| 7,010,204 B2 | 3/2006 | Reith et al. | |
| 7,064,889 B2 * | 6/2006 | Digonnet | G02B 6/03638 359/341.1 |
| 7,090,411 B2 | 8/2006 | Brown | |
| 7,116,870 B2 | 10/2006 | Poole | |
| 7,199,924 B1 | 4/2007 | Brown et al. | |
| 7,215,860 B2 | 5/2007 | Engelberth et al. | |
| 7,306,376 B2 | 12/2007 | Scerbak et al. | |
| 7,309,175 B1 | 12/2007 | Rosiewicz et al. | |
| 7,313,301 B2 | 12/2007 | Tabuchi | |
| 7,371,019 B2 | 5/2008 | Seifert | |
| 7,373,070 B2 | 5/2008 | Wetter et al. | |
| 7,391,561 B2 | 6/2008 | Di Teodoro et al. | |
| 7,412,137 B2 | 8/2008 | Suzuki et al. | |
| 7,429,734 B1 | 9/2008 | Tidwell | |
| 7,466,425 B2 | 12/2008 | Szafraniec | |
| 7,471,705 B2 | 12/2008 | Gerstenberger et al. | |
| 7,508,853 B2 | 3/2009 | Harter et al. | |
| 7,526,167 B1 | 4/2009 | Minelly | |
| 7,539,231 B1 | 5/2009 | Honea et al. | |
| 7,551,823 B2 | 6/2009 | Reith et al. | |
| 7,561,917 B2 | 7/2009 | Wegrzyn et al. | |
| 7,570,856 B1 | 8/2009 | Minelly | |
| 7,574,081 B2 | 8/2009 | Miyadera et al. | |
| 7,586,671 B2 | 9/2009 | Eiselt | |
| 7,620,077 B2 | 11/2009 | Henderson | |
| 7,671,337 B1 | 3/2010 | Tidwell | |
| 7,768,700 B1 | 8/2010 | Savage-Leuchs | |
| 7,813,603 B2 | 10/2010 | Nikolajsen | |
| 7,835,608 B2 | 11/2010 | Minelly et al. | |
| 7,847,227 B2 * | 12/2010 | Holmes | G01J 9/00 250/201.9 |
| 7,865,044 B2 | 1/2011 | Parker et al. | |
| 7,872,794 B1 | 1/2011 | Minelly et al. | |
| 7,876,498 B1 | 1/2011 | Honea et al. | |
| 7,876,803 B1 | 1/2011 | Di Teodoro et al. | |
| 7,924,496 B2 | 4/2011 | Eiselt | |
| 7,924,500 B1 | 4/2011 | Minelly | |
| 8,202,268 B1 | 6/2012 | Wells et al. | |
| 8,264,677 B2 | 9/2012 | Tekawa | |
| 8,355,608 B2 | 1/2013 | Hu | |
| 8,411,712 B2 | 4/2013 | Honea et al. | |
| 8,437,005 B2 | 5/2013 | Digonnet et al. | |
| 8,441,718 B2 | 5/2013 | Mead | |
| 8,452,147 B2 | 5/2013 | Avdokhin et al. | |
| 8,503,840 B2 | 8/2013 | Hu et al. | |
| 8,537,459 B2 | 9/2013 | Nati et al. | |
| 8,736,953 B2 | 5/2014 | Savage-Leuchs | |
| 8,755,649 B2 | 6/2014 | Yilmaz et al. | |
| 8,767,286 B2 | 7/2014 | Savage-Leuchs | |
| 8,811,789 B2 | 8/2014 | Reith et al. | |
| 8,830,568 B2 | 9/2014 | Savage-Leuchs | |
| 8,934,509 B2 | 1/2015 | Savage-Leuchs et al. | |
| 2002/0146206 A1 * | 10/2002 | Aleksoff | G02B 6/02095 385/48 |
| 2003/0174962 A1 * | 9/2003 | Poole | G02B 6/2852 385/48 |
| 2004/0036955 A1 * | 2/2004 | Digonnet | G02B 6/03638 359/341.1 |
| 2004/0042727 A1 * | 3/2004 | Aleksoff | G02B 6/02095 385/48 |
| 2004/0106211 A1 * | 6/2004 | Kauer | G01N 21/6428 436/169 |
| 2005/0074208 A1 * | 4/2005 | Badcock | G01J 1/4257 385/48 |
| 2006/0238770 A1 * | 10/2006 | Szafraniec | G01M 11/337 356/477 |
| 2007/0211995 A1 * | 9/2007 | Christensen | G02B 6/305 385/43 |
| 2007/0292087 A1 | 12/2007 | Brown | |
| 2008/0077200 A1 | 3/2008 | Bendett et al. | |
| 2008/0265150 A1 * | 10/2008 | Holmes | G01J 9/00 250/252.1 |
| 2008/0273852 A1 * | 11/2008 | Parker | G01J 5/08 385/128 |
| 2009/0168814 A1 | 7/2009 | Achtenhagen | |
| 2009/0323050 A1 * | 12/2009 | Tekawa | G01M 11/3145 356/73.1 |
| 2012/0281225 A1 * | 11/2012 | Digonnet | G01C 19/721 356/460 |
| 2013/0087694 A1 * | 4/2013 | Creeden | G01J 1/0425 250/227.11 |
| 2013/0343748 A1 * | 12/2013 | Benou | H04B 10/07957 398/29 |

OTHER PUBLICATIONS

Toeppen, "Toeppen—Apparatus and method for determining the optical power passing through an optical fiber", "United States Statutory Invention Registration—H1426", Apr. 4, 1995, pp. 1-6.

Boechat, Alvaro A.P., et al., "Bi-directional cladding power monitor for fibre optic beam delivery systems", "Measurement Science and Technology", Sep. 1992, pp. 897-901, vol. 3, No. 9.

* cited by examiner

PIXEL NUMBER [#]

SYSTEM FOR NON-CONTACT OPTICAL-POWER MEASUREMENT

CROSS-REFERENCE TO RELATED APPLICATIONS

This application claims priority benefit, under 35 U.S.C. §119(e), of U.S. Provisional Patent Application No. 61/978,736, filed Apr. 11, 2014 by Stephen J. Guimond, titled "SYSTEM AND METHOD FOR NON-CONTACT OPTICAL-POWER MEASUREMENT," which is incorporated herein by reference in its entirety.

This application is related to:
U.S. Pat. No. 7,391,561 that issued Jun. 24, 2008 to Fabio Di Teodoro et al., titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD";
U.S. Pat. No. 7,570,856 that issued Aug. 4, 2009 to John D. Minelly et al., titled "APPARATUS AND METHOD FOR AN ERBIUM-DOPED FIBER FOR HIGH PEAK-POWER APPLICATIONS";
U.S. Pat. No. 7,768,700 that issued Aug. 3, 2010 to Matthias P. Savage-Leuchs, titled "METHOD AND APPARATUS FOR OPTICAL GAIN FIBER HAVING SEGMENTS OF DIFFERING CORE SIZES";
U.S. Pat. No. 7,876,803 that issued Jan. 25, 2011 to Fabio Di Teodoro et al., titled "HIGH-POWER, PULSED RING FIBER OSCILLATOR AND METHOD";
U.S. Pat. No. 7,876,498 that issued Jan. 25, 2011 to Eric C. Honea et al., titled "PULSE-ENERGY-STABILIZATION APPROACH AND FIRST-PULSE-SUPPRESSION METHOD USING FIBER AMPLIFIER";
U.S. Pat. No. 7,924,500 that issued Apr. 12, 2011 to John D. Minelly, titled "MICRO-STRUCTURED FIBER PROFILES FOR MITIGATION OF BEND-LOSS AND/OR MODE DISTORTION IN LMA FIBER AMPLIFIERS, INCLUDING DUAL-CORE EMBODIMENTS";
U.S. Pat. No. 8,934,509 that issued Jan. 13, 2015 to Matthias P. Savage-Leuchs et al., titled "Q-SWITCHED OSCILLATOR SEED-SOURCE FOR MOPA LASER ILLUMINATOR METHOD AND APPARATUS";
U.S. Pat. No. 8,736,953 that issued May 27, 2014 to Matthias P. Savage-Leuchs, titled "HIGH-POWER LASER SYSTEM HAVING DELIVERY FIBER WITH NON-CIRCULAR CROSS SECTION FOR ISOLATION AGAINST BACK REFLECTIONS";
U.S. Pat. No. 8,830,568 that issued Sep. 9, 2014 to Matthias P. Savage-Leuchs et al., titled "HIGH BEAM QUALITY AND HIGH AVERAGE POWER FROM LARGE-CORE-SIZE OPTICAL-FIBER AMPLIFIERS";
U.S. Pat. No. 8,767,286 that issued Jul. 1, 2014 to Matthias P. Savage-Leuchs et al., titled "SIGNAL AND PUMP MODE-FIELD ADAPTOR FOR DOUBLE-CLAD FIBERS AND ASSOCIATED METHOD";
U.S. Pat. No. 8,755,649 that issued Jun. 17, 2014 to Tolga Yilmaz et al., titled "IN-LINE FORWARD/BACKWARD FIBER-OPTIC SIGNAL ANALYZER";
U.S. Pat. No. 8,355,608 that issued Jan. 15, 2013 to Yongdan Hu, titled "METHOD AND APPARATUS FOR IN-LINE FIBER-CLADDING-LIGHT DISSIPATION";
U.S. Pat. No. 8,411,712 that issued Apr. 2, 2013 to Eric C. Honea et al., titled "BEAM DIAGNOSTICS AND FEEDBACK SYSTEM AND METHOD FOR SPECTRALLY BEAM-COMBINED LASERS";
U.S. Pat. No. 8,503,840 that issued Aug. 6, 2013 to Yongdan Hu et al., titled "OPTICAL-FIBER ARRAY METHOD AND APPARATUS";
U.S. patent application Ser. No. 14/086,744 by Eric C. Honea et al., filed Nov. 21, 2013, titled "FIBER AMPLIFIER SYSTEM FOR SUPPRESSION OF MODAL INSTABILITIES AND METHOD"; (which issued as U.S. Pat. No. 9,214,781 on Dec. 15, 2015);
U.S. patent application Ser. No. 13/987,265 by Eric C. Honea et al., filed Feb. 18, 2014, titled "APPARATUS AND METHOD FOR FIBER-LASER OUTPUT-BEAM SHAPING FOR SPECTRAL BEAM COMBINATION"; (which issued as U.S. Pat. No. 9,366,872 on Jun. 14, 2016);
U.S. Provisional Patent Application 61/877,796 by Andrew Xing et al. filed Sep. 13, 2013, titled "APPARATUS AND METHOD FOR A DIAMOND SUBSTRATE FOR A MULTI-LAYERED DIELECTRIC DIFFRACTION GRATING";
U.S. patent application Ser. No. 14/121,004 by Andrew Xing et al. filed Sep. 15, 2014, titled "APPARATUS AND METHOD FOR A DIAMOND SUBSTRATE FOR A MULTI-LAYERED DIELECTRIC DIFFRACTION GRATING";
U.S. Provisional Patent Application 61/854,277 by Yongdan Hu et al. filed Apr. 30, 2014, titled "SYSTEM AND METHOD FOR HIGH-POWER, HIGH-STRAYLIGHT-LOAD FIBER ARRAY";
U.S. patent application Ser. No. 13/999,557 by Gregory J. Whaley filed Jun. 17, 2014, titled "METHOD AND APPARATUS FOR LOW-PROFILE FIBER-COUPLING TO PHOTONIC CHIPS";
each of which is incorporated herein by reference.

FIELD OF THE INVENTION

The present invention relates to optical systems, and more particularly to systems and methods for non-invasively measuring the power of optical signals propagating through optical systems (e.g., measuring the optical power propagating through an optical fiber without physically contacting the optical fiber and/or without altering the optical fiber by side-polishing or inducing cladding propagation by bending the optical fiber).

BACKGROUND OF THE INVENTION

A key parameter to monitor in any laser system is the power of the optical signal produced by the laser system. Conventional optical-fiber-power-measurement systems generally fall into one of two categories: (1) fiber-optic power measurement in which the fiber tip is cleaved or polished and inserted into a measurement head so that all power is read and stopped at the measurement head (also referred to herein as "interruption" power measurement); and (2) fiber optic devices for which the optical fiber is side polished or otherwise incorporated into an "in-line" power monitor that has some non-zero insertion loss.

Interruption power monitors interrupt the optical train, rendering it useless for in situ power measurement, monitoring, or fault detection. Examples of interruption power monitors include the Ophir PD300-IRG Fiber Optic Power Meter Head by Ophir Optronics Solutions Ltd. (www.ophiropt.com/laser-measurement-instruments/new-products/pd300-r), and the Thorlabs S140C with S120-FC Fiber Adapter by Thorlabs Inc. (www.Thorlabs.com/newgrouppage9.cfm?objectgroup_id=3328&pn=S140C#6034).

Conventional in-line power monitors use taps that compromise fiber integrity, risk optical damage at high power, and introduce insertion loss (e.g., conventional in-line power monitors alter the optical fiber in ways that risk damage in high-power applications, degrade optical performance, cause backscatter, and/or reduce power throughput). Examples of in-line power monitors include the EigenLight Series 500 Inline Optical Power Monitor by EigenLight Corporation (www.eigenlight.com/products/portable-optical-power-monitors/series-500), and the FiberLogix Inline Power Monitor (www.fiberlogix.com/Passive/powermonitor.html). In-line power monitors introduce an insertion loss by tapping off some of the power in the core to direct to an optical detector. In-line power monitors operate either by stripping off some optical power exploiting evanescent wave effects or by means similar to optical couplers or splitters. Conventional in-line power monitors are undesirable for efficiency and total power reasons where an in-line device is to remain in place during full operation (e.g., when it is required in change-monitoring systems, power feedback systems, fault detection system, and the like). Some conventional in-line power monitors alter the fiber with a side polish or notch to redirect or probe the power propagating in the cladding. This introduces a weakness in the fiber both mechanically and in laser damage threshold reduction. Alterations of the fiber surface and cladding are undesirable in high-power fiber laser systems. Conventional in-line power monitors that use these tap and other principles of operation lack data for operation higher than 80 watts (W) and have damage thresholds or max operating power specifications in the hundreds of milliwatts (mW) to a few 10's of watts range (e.g., approximately 50 W). Conventional in-line power monitors and their possible faults also introduce safety risks should the system fail and fire or system damage occur. Therefore, conventional in-line power monitors are unsuitable for safely measuring optical power in high-power systems (e.g., about 1 kilowatt or higher).

U.S. Patent Application Publication 2013/0087694 to Daniel J. Creeden et al. (hereinafter, "Creeden et al."), titled "INTEGRATED PARAMETER MONITORING IN A FIBER LASER/AMPLIFIER," published Apr. 11, 2013, and is incorporated herein by reference. Creeden et al. describe techniques for monitoring parameters in a high power fiber laser or amplifier system without adding a tap coupler or increasing fiber length. In some embodiments, a cladding stripper is used to draw off a small percentage of light propagating in the cladding to an integrated signal parameter monitor. Parameters at one or more specific wavelengths (e.g., pump signal wavelength, signal/core signal wavelength, etc.) can be monitored. In some such cases, filters can be used to allow for selective passing of signal wavelength to be monitored to a corresponding parameter monitor. The filters can be external or may be integrated into a parameter monitor package that includes cladding stripper with integrated parameter monitor. Other parameters of interest (e.g., phase, wavelength) can also be monitored, in addition to, or as an alternative to power. Numerous configurations and variations will be apparent in light of this disclosure (e.g., system-on-chip).

U.S. Pat. No. 4,586,783 issued May 6, 1986 to Bruce D. Campbell et al. (hereinafter, "Campbell et al."), titled "SIGNAL COUPLER FOR BUFFERED OPTICAL FIBERS," is incorporated herein by reference. Campbell et al. describe a signal coupler for buffered optical fibers that comprises a soft, transparent, polymeric rod against which the fiber is pressed by a rigid "key" having regularly spaced protrusions which induce periodic microbending of the fiber. An optical signal passing down the fiber may be coupled into the polymeric rod by the key pressing the fiber into the rod, and the signal extracted from the end of the rod. A similar process may be used to inject an optical signal into the fiber. The coupler may be used either as a termination for a fiber or as part of a non-destructive tap. The induced attenuation and the intensity of the extracted signal may be varied by varying the pressure on the key.

U.S. Pat. No. 4,824,199 issued Apr. 25, 1989 to William D. Uken (hereinafter, "Uken"), titled "OPTICAL FIBER TAP UTILIZING REFLECTOR," is incorporated herein by reference. Uken describes a tap for withdrawing light from an intermediate portion of an optical fiber core by passing light through a side of the optical fiber comprises an optical coupler in contact with an outside surface of an optical fiber which is bent and disposed in a plane. A light reflector extending transverse to the plane deflects the withdrawn light towards the end surface of a light element disposed completely outside the plane. A similar arrangement may be used to inject light to an intermediate portion of an optical fiber. The tap may be used as a read tap to withdraw light, or as a write tap to inject light in optical fiber networks.

U.S. Pat. No. 6,424,663 issued Jul. 23, 2002 to Bernard Fidric et al. (hereinafter, "Fidric et al."), titled "POWER MONITOR FOR FIBER GAIN MEDIUM," is incorporated herein by reference. Fidric et al. describe a fiber optic gain system that has output power monitoring and control using the detected level of side light emitted through the cladding of the gain fiber. The fiber is wound on a spool that is provided with an opening adjacent to the fiber cladding. A photodetector is mounted to the spool at an opposite side of the opening, and detects side light that is transmitted through the opening. An output signal from the photodetector is indicative of the output power or the gain of the system, and may be used for monitoring and/or to adjust the power generated by a pumping source for the system. This allows feedback control of the system that helps to stabilize the output power or gain. A filtering element may also be used to exclude certain undesired wavelengths from the side light being detected.

U.S. Pat. No. 6,744,948 issued Jun. 1, 2004 to Bo Pi et al. (hereinafter, "Pi et al."), titled "FIBER TAP MONITOR BASED ON EVANESCENT COUPLING," is incorporated herein by reference. Pi et al. describe fiber tap monitors formed on side-polished fiber coupling ports based on evanescent coupling.

U.S. Pat. No. 7,116,870 issued Oct. 3, 2006 to Craig D. Poole (hereinafter, "Poole"), titled "BROADBAND FIBER OPTIC TAP," is incorporated herein by reference. Poole describes a broadband optical fiber tap for transferring optical energy out of an optical fiber having an optical fiber with a primary and secondary microbends for the purpose of coupling optical energy into the higher-order modes of the fiber, and a reflecting surface formed in the cladding of the fiber and positioned at an angle so as to reflect, by total internal reflection, higher-order mode energy away from the optical fiber. In the preferred embodiment, the two microbends are spaced apart by a distance approximately equal to one-half of the intermodal beat length for LP01 and LP11 modes of a single-mode fiber.

U.S. Pat. No. 8,452,147 issued May 28, 2013 to Alexey V. Avdokhin et al. (hereinafter, "Avdokhin et al."), titled "ASSEMBLY FOR MEASURING OPTICAL SIGNAL POWER IN FIBER LASERS," is incorporated herein by reference. Avdokhin et al. describe a fiber laser system configured with a power measuring assembly surrounding a splice between two fibers. The power measuring assembly is operative to maintain the splice at a substantially constant splice temperature and shield the spliced fibers from external bending stresses so as to provide for power readings of the laser system at the splice independently from the influence of multiple variable external factors.

There is a need for an improved system and method for measuring the power of optical signals propagating through an optical fiber.

SUMMARY OF THE INVENTION

In some embodiments, the present invention provides a fiber-power-monitoring system that exploits the naturally occurring scattered energy that is a byproduct of optical-fiber propagation, and thus, in some embodiments, the present invention introduces no additional throughput losses because it seeks to characterize only the power lost to this inevitable scattering. In some embodiments, the present invention determines the optical power propagating through the optical fiber without making alterations to the optical fiber (such as side polishing or introducing bends, stresses, splices or the like to induce cladding propagation of some optical power). In some embodiments, the optical power is calculated from the naturally occurring core scattering so that physical contact is not required. In some embodiments, power measurement without physical contact increases the laser damage threshold of the optical fiber under test. In some embodiments, the present invention provides a linear detector array and algorithms operating on intensity-versus-position data in order to discriminate scattering-per-unit-length from "hot spots," cladding, buffer, or other non-uniform defects. In some embodiments, "hotspots" or spikes are eliminated prior to calculating an average or performing a functional fit that is later mapped to a power calibration look-up table or other functional mapping to power determinations. In some embodiments, the fiber-power-monitoring system of the present invention is suitable for both high-power systems (e.g., about 1 kilowatt (kW) or more) and systems that operate at power levels less than about 1 kW.

In some embodiments, the present invention provides a method for measuring optical power that includes providing an optical-scattering medium (e.g., solid-state laser gain media such as Nd:YAG or passive optical materials such as fused silica, BK-7 glass, water, air, or the like) configured to propagate an optical signal, wherein a portion of the optical signal scatters out of the optical-scattering medium along a length of the optical-scattering medium to form scattered light; imaging, at a first time period, the scattered light along the length of the optical-scattering medium and outputting a first image signal based on the imaged scattered light; and determining a power value of the optical signal based on the first image signal.

In some embodiments, the present invention includes a housing to hold the fiber-power-monitoring system fixed with respect to the optical fiber, imaging optics (such as a cylindrical lens and the like), a linear detector or arbitrary array of detectors, electronics for converting the optical signal to analyzable data, algorithms for the analysis of the data for pattern matching, data filtering, data rejection, intelligent selection of data, and the like, and the conversion of the analysis results to an optical power by means of a function or calibration table.

In some embodiments, the present invention includes a variety of optical components and systems in the imaging train to assist in signal discrimination from noise, and remove bias from systematic error sources. For example, in some embodiments, optical imaging components include polarization filters to discriminate scattered light from other sources. In some embodiments, optical imaging components include wavelength filters to discriminate signal from other background sources. In some embodiments, optical imaging components include neutral density filters to extend detector range and linearity. In some embodiments, optical imaging components include some combination of two or more of the above components.

In some embodiments, the present invention includes "upstream" fiber-treatment components that assist in improving calibration repeatability and accuracy. For example, in some embodiments, the present invention includes fiber loops on mandrels for stripping out cladding-mode power that might have been introduced by upstream fiber defects and thus bias results idiosyncratically to local defects rather than overall fiber characterization. In some embodiments, the present invention includes cladding dumps formed by running fiber through channels of index matching fluids (with or without optional stripping of buffer or other layers as required for the particular fiber under test).

In some embodiments, the present invention provides imaging without contacting the optical fiber to measure the optical power of an optical signal propagating in the optical fiber. In some embodiments, the present invention uses "naturally occurring" core-scattering which requires no additional signal boosts with bends, notches, or taps. In some embodiments, the present invention exploits rejection algorithms to intelligently reject optical power outlier data points that correlate to fiber defects rather than true optical power. In some embodiments, the present invention exploits polarization properties of polarization-maintaining fibers and directionality of Rayleigh scattering, coupled with lock-in detection & polarization modulation, to discriminate core photons specifically.

DETAILED DESCRIPTION OF THE INVENTION

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As used herein, "insertion loss" refers to the loss of signal power resulting from the insertion of a device in an optical fiber.

Figure 1A:
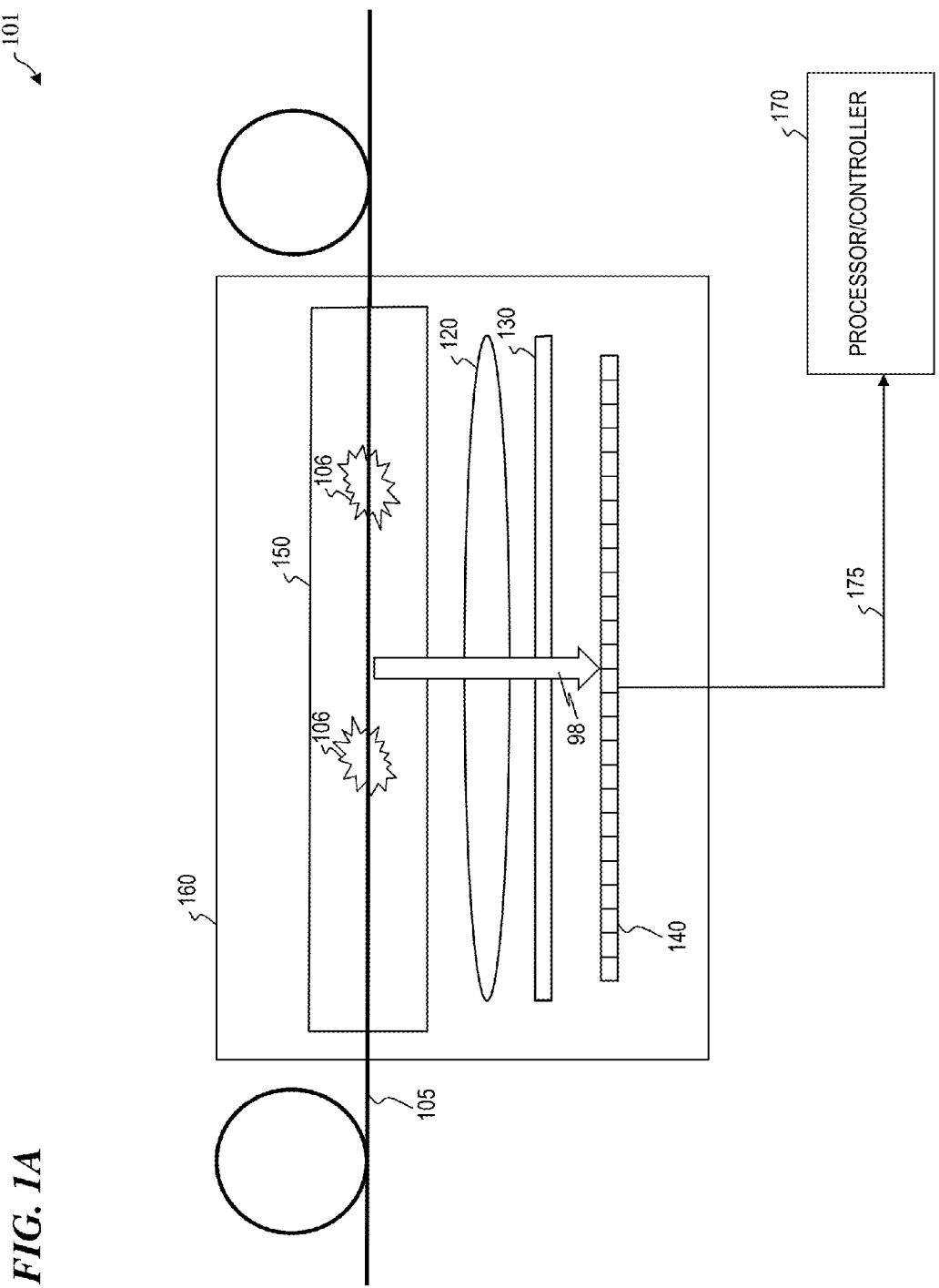
FIG. 1A is a schematic diagram of a system 101 for measuring the optical power in an optical fiber 105.

FIG. 1A is a schematic diagram of a system 101 for measuring the optical power in an optical fiber 105. In some embodiments, system 101 measures the optical power of light 98 that is scattered by the core of optical fiber 105 as it propagates through the core (e.g., in some embodiments, light 98 is light that is scattered via Rayleigh scattering). Since system 101 measures naturally occurring scattered light 98, system 101, in some embodiments, provides optical power measurement without physically altering and/or contacting optical fiber 105 such that there is minimal or no insertion loss. In some embodiments, optical fiber 105 includes a first cladding layer that surrounds the core and a second cladding layer that surrounds the first cladding layer, wherein the first cladding layer has a lower index of refraction than that of the core, and wherein the second cladding layer has a lower index of refraction than that of the first cladding layer. In some embodiments, system 101 includes imaging optics 120, secondary optics 130, a detector 140, and a dark background 150. In some embodiments, system 101 further includes a housing 160 that contains imaging optics 120, secondary optics 130, detector 140, and background 150, and is configured to hold system 101 fixed with respect to optical fiber 105 (in some embodiments, system 101 is fixed with respect to optical fiber 105 without the use of housing 160). In some embodiments, at least a portion of optical fiber 105 is held in a fixed position by a spiral-mandrel assembly such as described in U.S. patent application Ser. No. 14/086,744, which is incorporated herein by reference. In some embodiments, system 101 includes a processor/controller 170 (e.g., a computer system) that is operatively coupled to detector 140 via connection 175. In some embodiments, connection 175 is a wired connection. In other embodiments, connection 175 is a wireless connection. In some embodiments, processor/controller 170 is configured to process the data detected by detector 140 and output a measured-optical-power value.

In some embodiments, imaging optics 120 includes a lens. In some embodiments, imaging optics 120 includes an imaging fiber that is operatively coupled to detector 140. In some embodiments, secondary optics 130 assists with signal discrimination and noise/systemic error filtering. In some such embodiments, secondary optics 130 includes a polarization filter. In other such embodiments, secondary optics 130 includes a wavelength filter configured to separate pump light from signal light. In other such embodiments, secondary optics 130 includes modulation optics such as a photoelastic modulator or liquid-crystal variable retarder device that is configured to exploit lock-in detection in order to distinguish core light from cladding light. In other such embodiments, secondary optics 130 includes a neutral density filter configured to extend the range of detector 140 and configured to extend linearity. In still other such embodiments, secondary optics 130 includes a combination of two or more of the previously described components. In some embodiments, fiber 105 is oriented with respect to its core in order to optimize the degree of polarization of scattered light 98.

In some embodiments, detector 140 is a linear-array detector that detects light 98 across a length of optical fiber 105 in order to reject defects (e.g., hotspots 106) that may bias single-pixel measurements. For example, in some such embodiments, detector 140 is a complementary metal-oxide-semiconductor (CMOS) linear image sensor such as provided by Hamamatsu Photonics K.K. (www.hamamatsu-.com/us/en/product/alpha/C/4119/index.html). In some embodiments, the Hamamatsu-CMOS-linear-image family of sensors detects light in a range of 200 to 1000 nanometers (nm) and varies in pixel count from 64 to 4098 pixels. In some embodiments, detector 140 is a linear-array detector such as the Indium-Gallium-Arsenide (InGaAs) p-type intrinsic n-type (PIN) photodiode array provided by Hamamatsu Photonics K.K. (www.hamamatsu.com/us/en/product/alpha/114107/index.html). In some embodiments, the Hamamatsu InGaAs-PIN-photodiode-array family of sensors detects light in a range of 700 to 1700 nm and varies in pixel count from 16 to 46 pixels. In some embodiments, detector 140 is a machine-vision camera such as the EO-0413M Monochrome USB 3.0 Camera provided by Edmunds Optics, Inc. (www.edmundoptics.com/imaging/cameras/usb-cameras/eo-usb-3-0-cmos-machine-vision-cameras/86-752). In some embodiments, detector 140 is a two-dimensional-array detector (also referred to herein as an M-by-N detector). In some embodiments, detector 140 is any other suitable imaging device (e.g., in some embodiments, detector 140 is any imaging device whose sensitivity is appropriate for the wavelength range or power range of interest). In some embodiments, detector 140 is any other suitable light-detection device (e.g., in some embodiments, detector 140 is any detector whose sensitivity is appropriate for the wavelength range or power range of interest).

In some embodiments, imaging and/or light-detection data obtained by detector 140 is used with algorithms operating on an intensity-versus-position data in order to discriminate scattering-per-unit-length from hotspots 106, cladding, buffer, or other non-uniform defects. In some embodiments, hotspots or spikes 106 are eliminated prior to calculating an average or performing a functional fit that is later mapped to a power calibration look-up table or other functional mapping to power determinations.

In some embodiments, system 101 is suitable for measuring optical power in optical fiber that is in the high-power range (e.g., in some embodiments, at least one kilowatt (1 kW)) without risking laser damage. In some embodiments, system 101 provides optical power measurements without introducing insertion loss. In some embodiments, system 101 provides optical power measurements without making physical contact with fiber 105 (or at least without making physical contact with the portion of optical fiber 105 being measured) in order to prevent laser damage. In some embodiments, system 101 provides power-change detection to facilitate safety interlock or failsafe shutdown. In some embodiments, system 101 facilitates various closed-loop power response operations (e.g., closed loop constant power maintenance). In some embodiments, system 101 requires no splicing to optical fiber 105. In some embodiments, system 101 is movable to optimize system configuration. In some embodiments, system 101 is removable should the user be interested in using it only as a diagnostic or factory-set instrument. In some embodiments, system 101 remains in situ in order to monitor power during operation. In some embodiments, system 101 provides power calibration for a family of fibers.

Figure 1B:
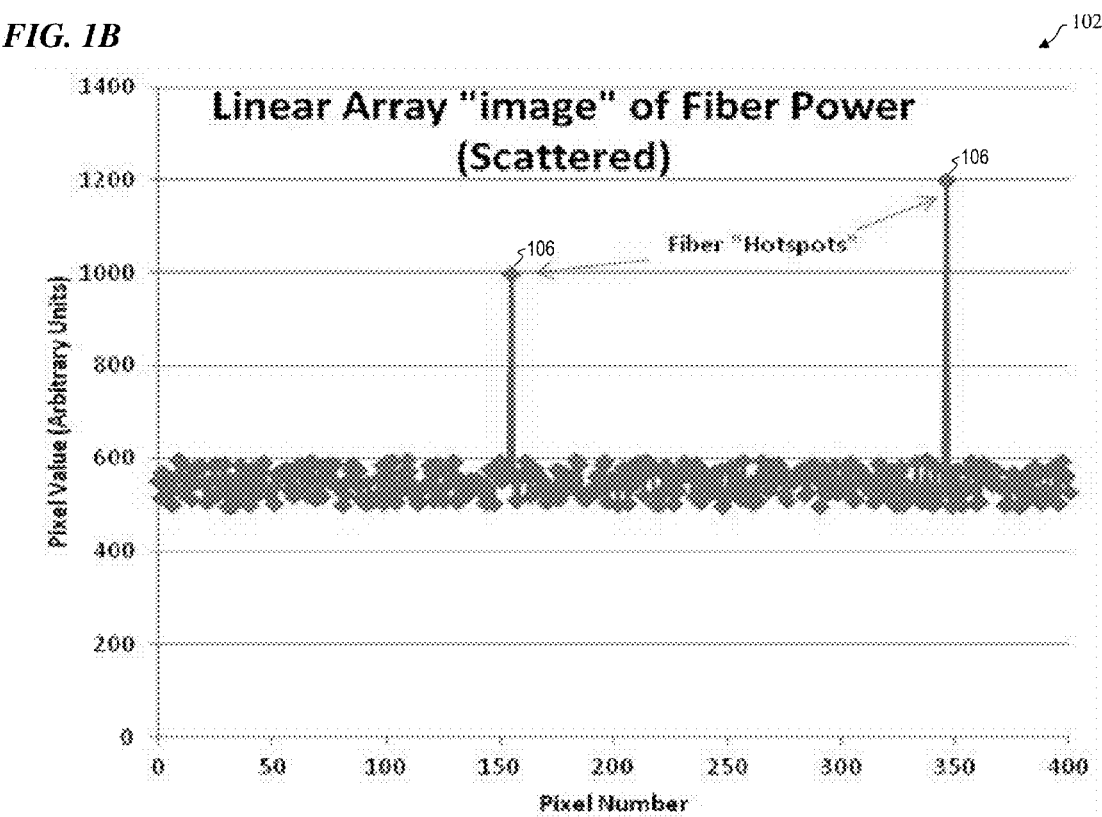
FIG. 1B is a graph 102 depicting a linear-array image of fiber power obtained by detector 140.

FIG. 1B is a graph 102 depicting a linear-array image of fiber power obtained by detector 140. In some embodiments, the linear-array data provided by detector 140 affords analysis by several means including rejection of out-of-family hotspots or dark dropouts (e.g., hotspots 106). In some embodiments, graph 102 is produced by processor/controller 170.

Figure 1C:
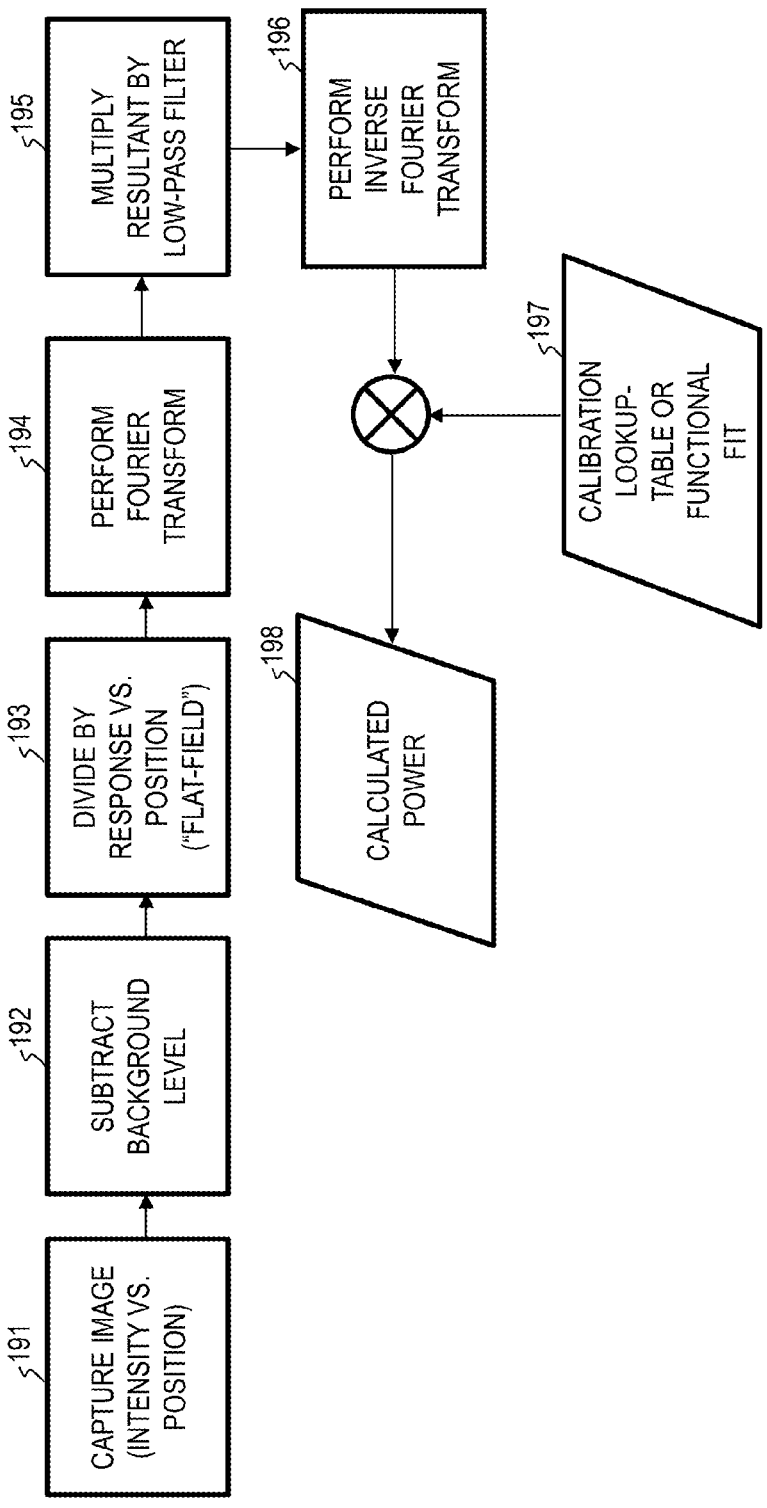
FIG. 1C is a block diagram of an algorithm 103 for calculating the optical power in optical fiber 105.

FIG. 1C is a block diagram of an algorithm 103 for calculating the optical power in optical fiber 105. In some embodiments, algorithm 103 allows hot spots 106, which appear as "spikes" in the intensity versus position data of FIG. 1B, to be filtered out in order to remove bias from the final calculation of power. In some embodiments, algorithm 103 can be performed due to the inclusion of linear or two-dimensional array detectors (e.g., a linear-array detector such as described for detector 140). In some embodiments, measuring power using a linear-array detector with algorithm 103 improves upon the power measurement of a single-pixel detector (e.g., detector 240 of FIG. 2) because a single-pixel detector would likely be mislead by hot spots 106.

In some embodiments, at block 191 a detector (e.g., detector 140 of FIG. 1A) captures an image of a length of optical fiber 105 (e.g., in some embodiments, the captured image shows intensity versus position along the length of fiber 105). In some embodiments, detector 140 sends data regarding the captured image to a processor (e.g., processor/controller 170 of FIG. 1A or system 601 of FIG. 6), which performs blocks 192-198. In some embodiments, at block 192, the background level in the image data is subtracted. In some embodiments, at block 193, the data outputted by block 192 is then divided by response versus position (also known as "flat-field"). In some embodiments, at block 194, a Fourier Transform is performed on the data outputted by block 193, and at block 195, the resultant from block 194 is multiplied by a low-pass filter. In some embodiments, at block 196, an inverse Fourier Transform is performed on the data outputted by block 195. In some embodiments, the output of block 196 is combined with information from a calibration lookup-table or a functional fit (e.g., see 197 to generate the calculated power of block 198. In some embodiments, the Fourier Transform of block 194 and the low-pass filter of block 195 are replaced by smoothing operations which replace the value at any pixel with the average of itself and some quantity of its neighbors to reduce the effects of hotspots. In some embodiments, the Fourier Transform of block 194 and the low-pass filter of block 195 are replaced by statistical rejection which discards pixel values higher than certain thresholds in order to discard "hotspot" outlier data.

Figure 2:
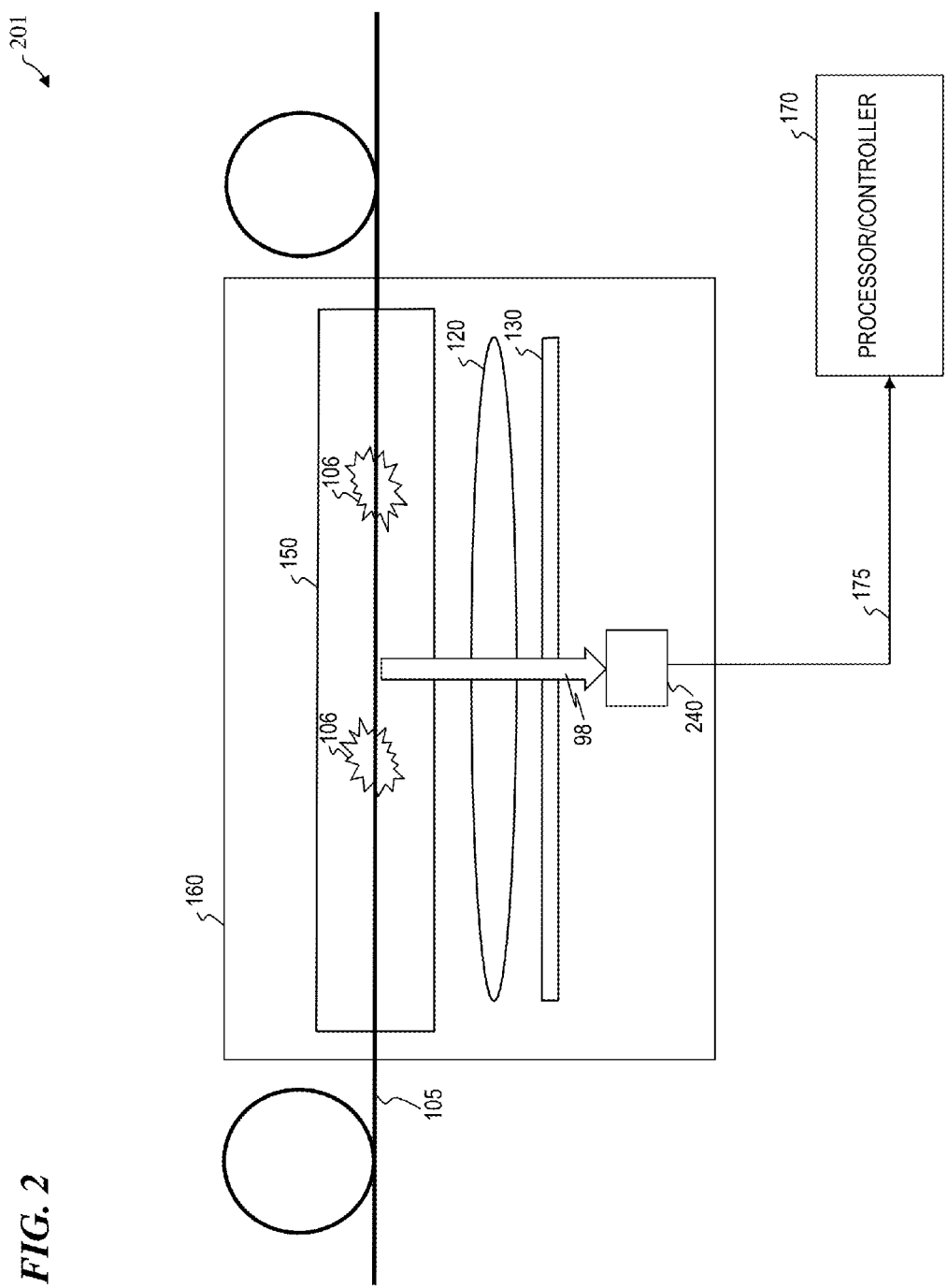
FIG. 2 is a schematic diagram of a system 201 for measuring the optical power in optical fiber 105.

FIG. 2 is a schematic diagram of a system 201 for measuring the optical power in optical fiber 105. In some embodiments, system 201 is substantially similar to system 101 except that system 201 includes a single-pixel detector 240. For example, in some embodiments of system 201, detector 240 is an Indium-Gallium-Arsenide (InGaAs) Photodiode such as provided by Thorlabs Inc. (www.thorlabs.com/thorproduct.cfm?partnumber=FDGA05). In some such embodiments, detector 240 is fast enough to perform roles as a change detector or failure-shutdown detector. In some embodiments of system 201, secondary optics 120 includes a wavelength filter. In some embodiments, system 201 provides power measurement for relative power or fault detection. In some embodiments, system 201 is inexpensive and "clips-on" to any position in fiber 105. In some embodiments, system 201 is used in combination with lock-in detection and polarization modulation such as described in FIG. 3.

Figure 3:
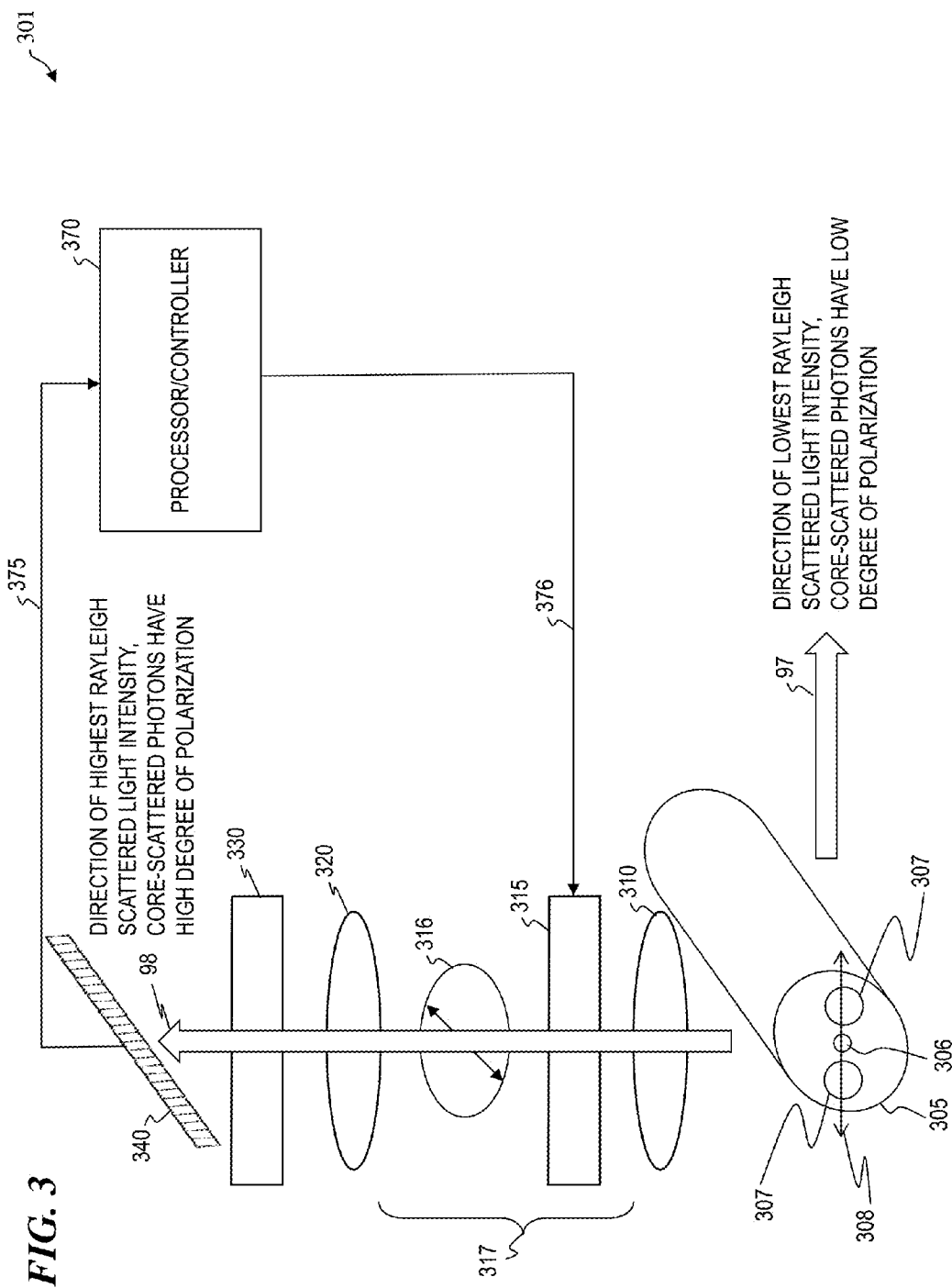
FIG. 3 is a schematic diagram of a system 301 for measuring the optical power in an optical fiber 305.

FIG. 3 is a schematic diagram of a system 301 for measuring the optical power in an optical fiber 305. In some embodiments, optical fiber 305 is a polarization-maintaining (PM) fiber (e.g., a "panda" style fiber) and has a known polarization orientation 308 (e.g., a slow-axis aligned polarization) that shows the direction of the electric field of the core-propagated light signal. In some embodiments, fiber 305 includes a fiber core 306 and "panda"-style PM fiber-stress members 307. In some embodiments, due to the operation of Rayleigh scattering, photons scattered in the direction perpendicular to both the fiber-propagation direction and the polarization-electric-field direction (i.e. scattered light 98) is higher in intensity and degree of polarization. In some embodiments, therefore, core-scattered photons are distinguished from background levels by analyzing and/or modulating scattered light 98. In some embodiments, due to the operation of Rayleigh scattering, photons scattered in the direction parallel to the electric field of the polarization (i.e., scattered light 97) are fewer and have a lower degree of polarization. In some embodiments, the optical components of system 301 are arranged, based on polarization orientation 308, to take advantage of the high amount of Rayleigh scatter and high degree of polarization associated with scattered light 98. In some embodiments, system 301 provides optical power measurement without physically altering and/or contacting optical fiber 305 such that there is minimal or no insertion loss. In some embodiments, system 301 provides power calibration for a family of fibers.

In some embodiments, system 301 includes collimating optics 310 and imaging optics 320 (e.g., in some embodiments, a collimating lens 310 and an imaging lens 320). In some embodiments, the space between collimating optics 310 and imaging optics 320 is collimated space 317, which is an appropriate region for placing a single or compound optical assembly including, for example, wavelengths filters, neutral-density filters, polarization modulators (e.g., polarization-modulator 315), polarization filters (e.g., polarizer 316), and/or the like.

In some embodiments, polarization modulator 315 includes a liquid-crystal (LC) modulator. In some embodiments, polarization modulator 315 includes a photoelastic modulator (PEM). In some embodiments, polarization modulator 315 is any other suitable polarization modulator. In some embodiments, polarizer 316 is an active polarizer. In other embodiments, polarizer 316 is a passive polarizer. In some embodiments, polarization modulator 315 and polarizer 316 are configured to modify the polarization or the intensity amplitude of light 98. In some embodiments, the polarization modification provided by modulator 315 and polarizer 316, along with lock-in detection algorithms provided by processor/controller 370 (e.g., in some embodiments, processor/controller 370 includes a lock-in amplifier), help to improve the signal-to-noise ratio of light 98 such that greater core-light distinction in light 98 can be achieved.

In some embodiments, system 301 further includes secondary optics 330 (e.g., in some embodiments, a wavelength filter) and a detector 340. In some embodiments, imaging optics 320 images light 98 onto detector 340. In some embodiments, detector 340 includes a linear-array detector that is aligned along the length of fiber 305. In some embodiments, detector 340 is a two-dimensional-array detector. In some embodiments, detector 340 is a single-pixel detector. In some embodiments, detector 340 is a camera. In some embodiments, detector 340 is a high bandwidth (BW) detector. In some embodiments, detector 340 is any other suitable light-detection device. In some embodiments, detector 340 is operatively coupled to processor/controller 370 via connection 375, and processor/controller 370 is also operatively coupled to polarization modulator 315 via connection 376. In some embodiments, connection 375 and 376 are wired connections. In some embodiments, connections 375 and 376 are wireless connections. In some embodiments, one of connections 375 and 376 is wired and the other connection is wireless.

Figure 4A:
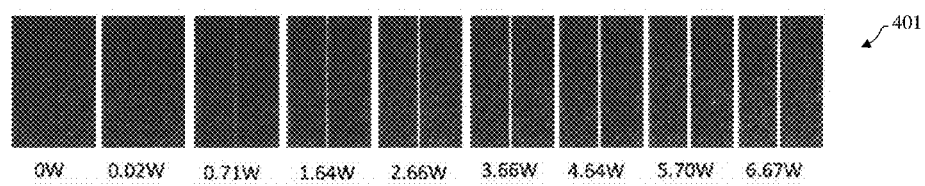
FIG. 4A is a schematic diagram of images 401 generated by a linear-array detector according to one embodiment of the present invention.

FIG. 4A is a schematic diagram of images 401 generated by an imaging camera. In some embodiments, each image 401 represents a different optical power that is detected at different times along the same length of an optical fiber (e.g., in some embodiments, each image 401 is generated using system 101 of FIG. 1A, but with the optical signal set at different power values for each image).

Figure 4B:
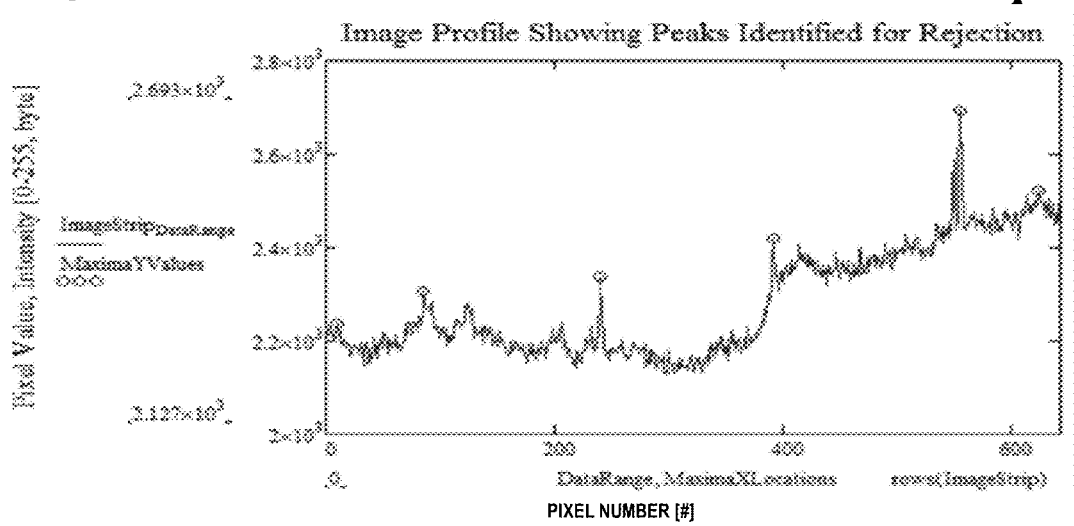
FIG. 4B is a graph 402 depicting a linear-array profile of fiber power that is generated based on one of the images 401 of FIG. 4A.

FIG. 4B is a graph 402 depicting a linear-array profile of fiber power that is generated based on one of the images 401 of FIG. 4A. In some embodiments, the present invention provides software (executed by, for example, processor/controller 170 of FIG. 1A or system 601 of FIG. 6) that identifies and rejects local discontinuities in the linear-array profile along the length of the optical fiber (e.g., in some embodiments, graph 402 identifies peaks in the linear-array profile that are to be rejected when calculating output power).

Figure 4C:
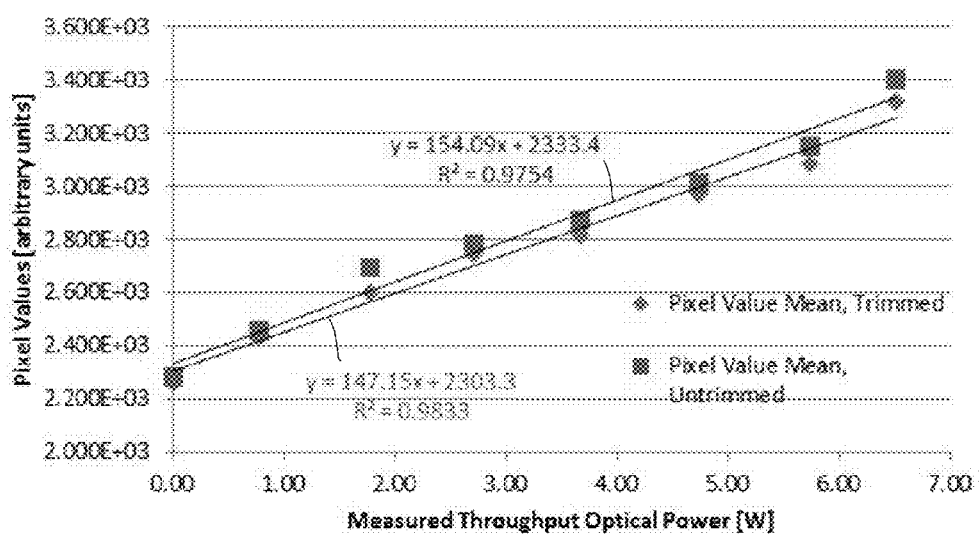
FIG. 4C is a graph 403 depicting the measured output power that is determined based, at least in part, on graph 402 of FIG. 4B.

FIG. 4C is a graph 403 depicting the measured output power that is determined based, at least in part, on graph 402 of FIG. 4B. In some embodiments, graph 403 shows how a functional fit (e.g., a linear fit) is made between the values detected by an array detector of the present invention and measured output power. In some embodiments, this linear fit is improved by the rejecting or trimming of hot spots from the raw data such as the peaks identified in graph 402 of FIG. 4B. In some embodiments, the data used for graph 402 and graph 403 was based on a non-contact imaging experiment using system 101 of FIG. 1A that demonstrated the calibration and linearity associated with the power measurement of the present invention. In some embodiments, only monotonic behavior is required for the calibration shown in graph 403.

Figure 5A:
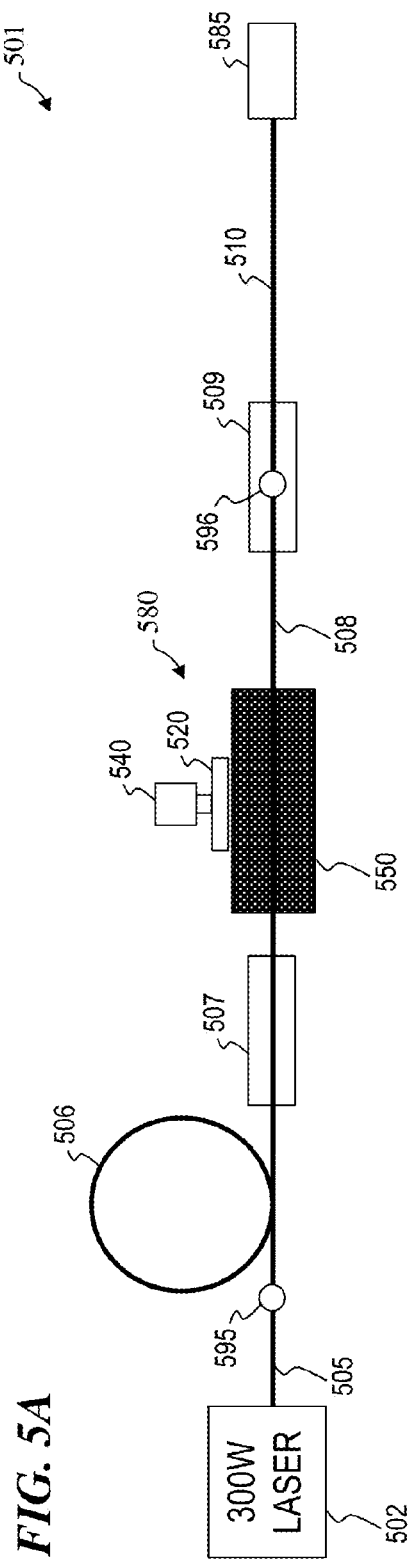
FIG. 5A is a schematic diagram of a system 501 for measuring the optical power in an optical fiber.

FIG. 5A is a schematic diagram of a system 501 for measuring the optical power in an optical fiber. In some embodiments, system 501 includes an optical-signal generator 502 (in some embodiments, generator 502 is a 300-W laser). In some embodiments, optical-signal generator 502 is coupled to a passive double-clad optical fiber 505 having a 20-micron-diameter (20 µm) core and a 400-micron-diameter (400 µm) outer cladding (also referred to herein as a 20/400 optical fiber). In some embodiments, passive fiber 505 is spliced to a 5-meter-long gain fiber 506 at splice 595. In some embodiments, gain fiber 506 is a double-clad PLMA-YDF (polarization-maintaining-large-mode-area ytterbium-doped-fiber) 20/400 optical fiber such as provided by nLight, Leiki, Nufern, CorActive, or the like. In some embodiments, gain fiber 506 is coupled to a pump dump 507 (e.g., in some embodiments, pump dump 507 includes a stripped gain fiber and/or an index-matching fluid or adhesive). In some embodiments, pump dump 507 is coupled to a doped gain fiber 508 that runs between pump dump 507 and a second pump dump 509. In some embodiments, gain fiber 508 has a length of about 1 meter (3.28 feet).

In some embodiments, system 501 further includes a power-detection module 580 that is coupled to gain fiber 508 and configured to detect a power of an optical signal propagating through gain fiber 508. In some embodiments, module 580 includes a wavelength filter 520 configured to separate pump light from signal light, a black background 550, and a detector 540 configured to image or detect the light scattered from the core of fiber 508. In some embodiments, detector 540 is a detector or camera such as described above for detector 140 of FIG. 1A. In some embodiments, fiber 508 is spliced to a passive single-clad 20/400 delivery fiber 510 at splice 596. In some embodiments, delivery fiber 510 is coupled to a calibration power meter 585 configured to provide calibration of power-detection module 580 (in some such embodiments, power meter 585 is an Ophir PD300-IRG Fiber Optic Power Meter Head by Ophir Optronics Solutions Ltd. (www.ophiropt.com/laser-measurement-instruments/new-products/pd300-r)). In some such embodiments, placing meter 585 downstream of pump dumps 507 and 509 assures that cladding pump light is subtracted from the signal light when analyzing the power-detection data generated by module 580. In some embodiments, system 501 further includes polarization modulation and lock-in detection (e.g., such as provided by system 301 of FIG. 3) to further improve the signal-to-noise ratio of the data generated by module 580.

Figure 5B:
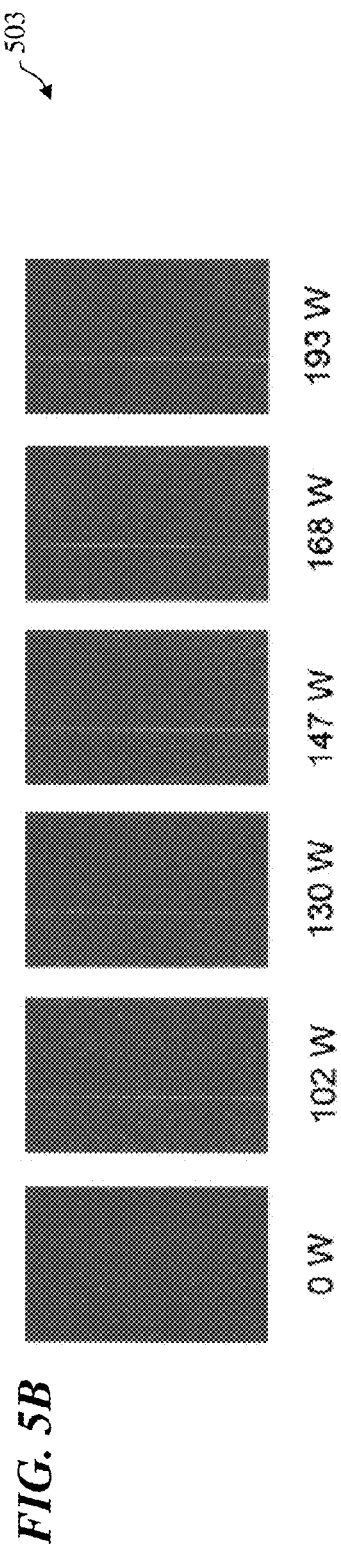
FIG. 5B is a schematic diagram of images 503 generated by detector 540 of FIG. 5A.

FIG. 5B is a schematic diagram of images 503 generated by detector 540 of FIG. 5A. In some embodiments, each image 503 represents a different optical power that is detected at different times along the same length of fiber 508. In some embodiments, the high-power imaging illustrated by images 503 is scalable with appropriately chosen gain and attenuation filters such as provided by system 501 of FIG. 5A.

Figure 5C:
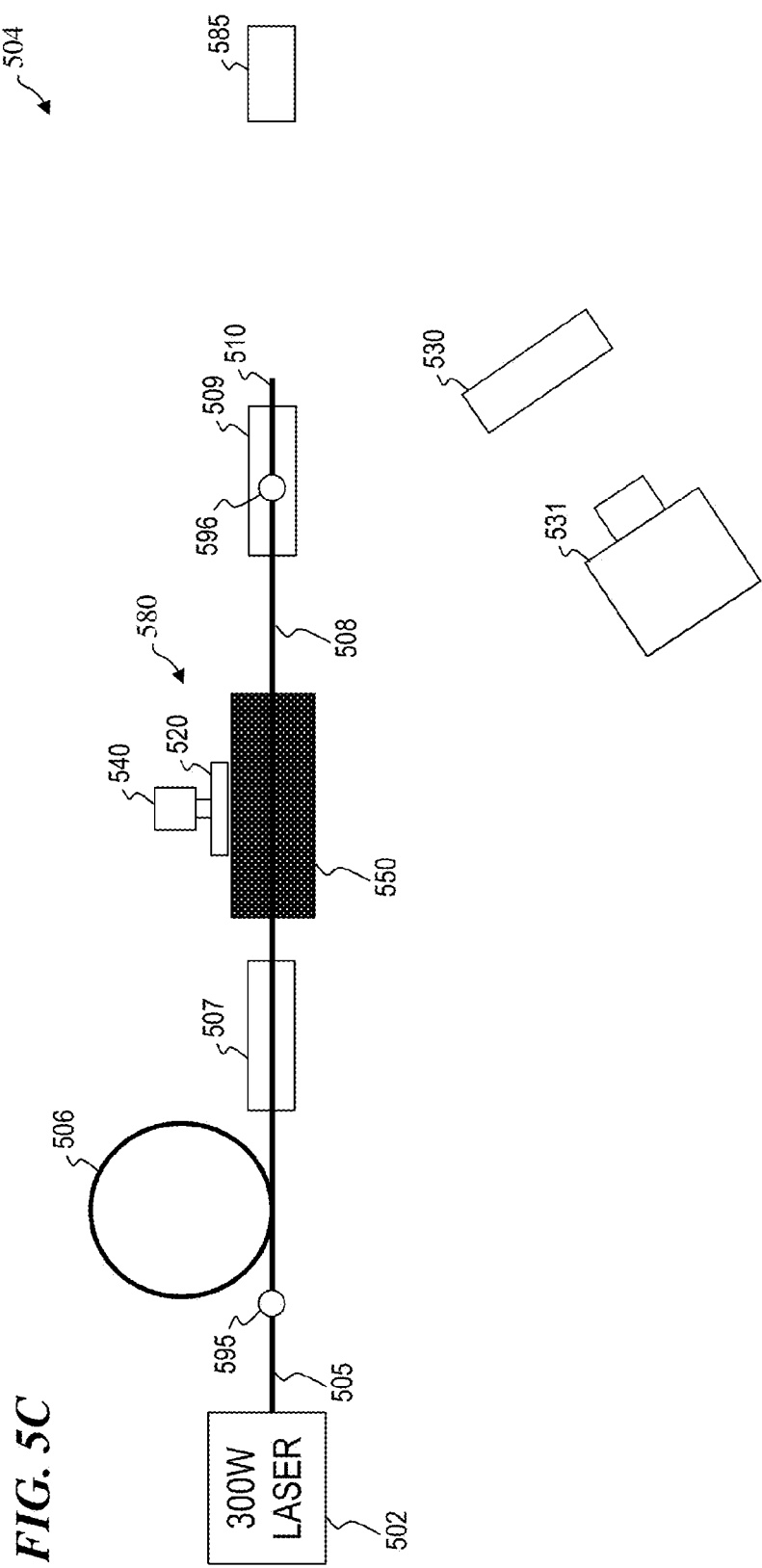
FIG. 5C is a schematic diagram of a system 504 for measuring the optical power in an optical fiber.

FIG. 5C is a schematic diagram of a system 504 for measuring the optical power in an optical fiber. In some embodiments, system 504 is substantially similar to system 501 of FIG. 5A except that delivery fiber 510 is cleaved or polished such that there is a free space beam between the end of delivery fiber 510 and power meter 585. In some embodiments, system 504 further includes a camera 531 that is configured to image the light beam that is outputted from fiber 510 as the light beam strikes power meter 585. In some embodiments, an optical attenuator 530 (e.g., a neutral density filter, partially reflecting mirror, smoked glass, or the like) is used to control optical power levels at camera 531. In some embodiments, the imaging provided by camera 531 is used to center the light beam on power meter 585.

In some embodiments, system 504 is further used to calibrate system 580 (e.g., in some embodiments, system 504 is used to create a look-up table of system 580 response versus actual power at power meter 585). In some embodiments, power meter 585 is traceably calibrated to widely accepted optical power and wavelength standards (e.g., a National Institute of Standards and Technology (NIST) traceable calibration). In some embodiments, detector 540 is a linear-array detector such as shown and described for some embodiments of FIG. 1A (in some such embodiments, detector 540 is the CMOS linear-image sensor provided by Hamamatsu Photonics K.K. described above). In some embodiments, camera 531 is a duplicate model of detector 540. In some such embodiments, power readings at power meter 585 are used to confirm that camera 531 and thus detector 540 have sufficient dynamic range to be useful over the power range for the intended application of system 580. In some embodiments, the pixel counts generated by camera 531 from imaging the light beam on power meter 585 are used to determine whether camera 531 has a monotonic response (e.g., the pixel counts never decrease as the values of the optical power increase) over sufficient optical power range.

Figure 6:
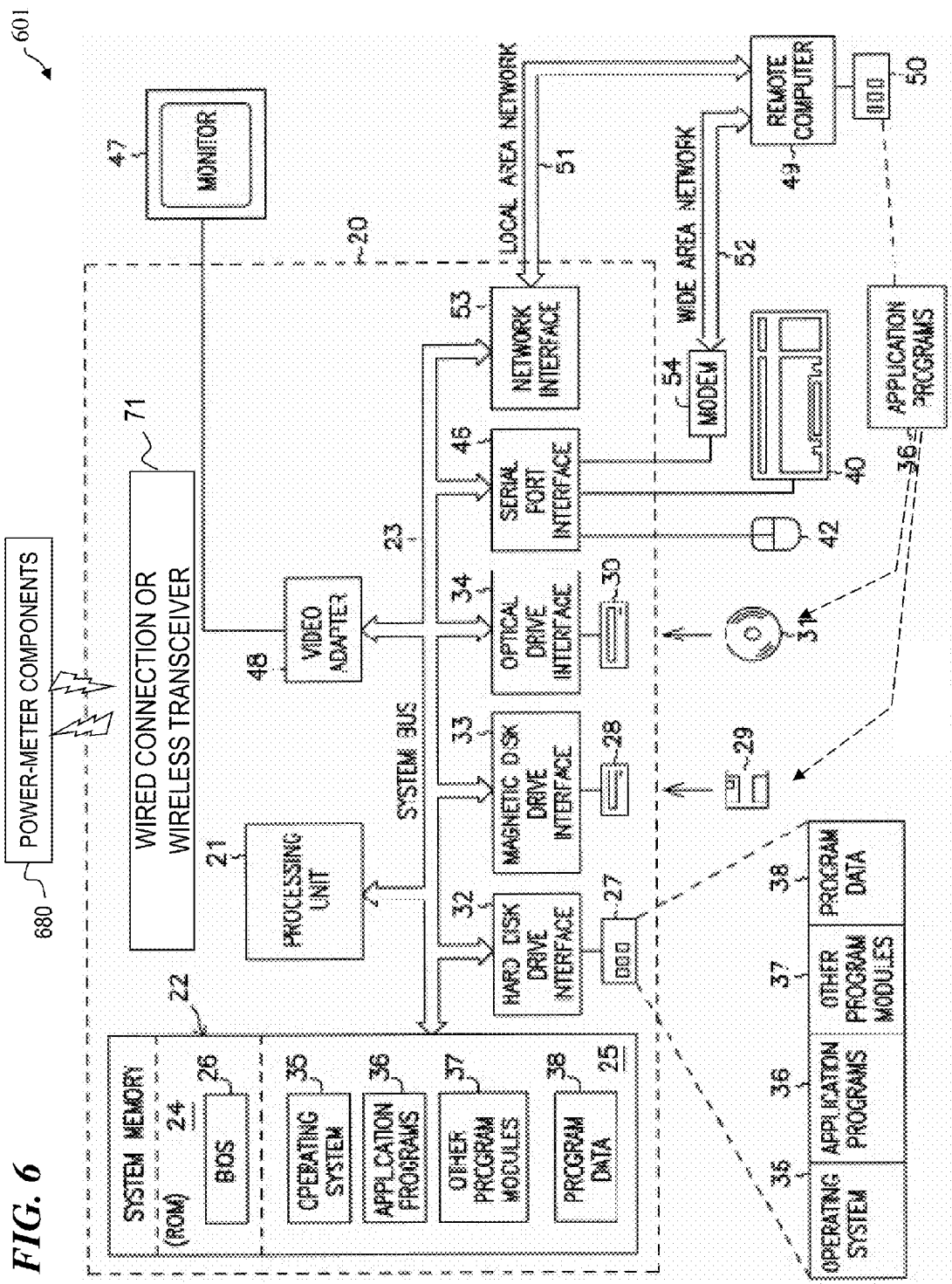
FIG. 6 is an overview diagram of a hardware- and operating-environment (or system) 601 that is used in conjunction with embodiments of the invention.

FIG. 6 is an overview diagram of a hardware- and operating-environment (or system) 601 that is used in conjunction with embodiments of the invention. The description of FIG. 6 is intended to provide a brief, general description of suitable computer hardware and a suitable computing environment in conjunction with which the invention may be implemented. In some embodiments, the invention is described in the general context of computer-executable instructions (e.g., in some embodiments, these instructions are stored on non-transient storage media such as USB FLASH drives, floppy disks, CDROM, storage connected to the internet, or the like, and are used for performing a method used in some embodiments of the present invention), such as program modules, that are stored on computer-readable media and that are executed by system 601, such as a microprocessor residing in a controller like processor/controller 170 of FIG. 1A. Generally, program modules include routines, programs, objects, components, data structures, and the like, that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network personal computers (network PCs), minicomputers, mainframe computers, and the like. The invention may also be practiced in distributed computer environments where tasks are performed by input-output remote processing devices that are linked through a communications network. In a distributed computing environment, program modules may be located in both local and remote memory storage devices.

In some embodiments, system 601 includes a user-control console computer 20 that is programmable and that has a wireless (or wired, optical fiber, or other direct connection) transceiver 71 that allows wireless control of, and/or sensing from (i.e., reprogramming of the remote microprocessors, as well as receiving sensed signals and diagnostic information from power-meter components 680 (e.g., in some embodiments, components 680 include polarization modulator 315 and detector 340 of FIG. 3).

In some embodiments, hardware and operating environment 601 is applicable to system 101, system 201, system 301, system 501, and/or system 504 of FIGS. 1A, 2, 3, 5A, and 5C, respectively, as a whole and/or any of the individual components shown in FIGS. 1A, 2, 3, 5A, and/or 5C. In some embodiments, application programs 36 stored on a computer-readable storage device (e.g., optical disk 31 (CDROM, DVD, Blu-ray Disc™ (BD), or the like), magnetic or FLASH storage device 29 (e.g., floppy disk, thumb drive, SDHC™ (Secure-Data High-Capacity) memory card or the like), and/or a storage device 50 connected to a remote computer 49 (e.g., in some embodiments, customer devices 320 of FIG. 3) that connects to computer 20 across a local-area network 51 or a wide-area network 52 such as the internet) contain instructions and/or control structures (such as look-up tables, control parameters, databases and the like) that are processed and/or transmitted to components 680 to control their operation by methods of the present invention described herein. In some embodiments, the applications programs 36 are partially executed in the computer 20.

As shown in FIG. 6, in some embodiments, the hardware- and operating-environment includes user-control console computer 20, or a server 20, includes a processing unit 21, a system memory 22, and a system bus 23 that operatively couples various system components including the system memory 22 to the processing unit 21. In some embodiments, there may be only one, or in other embodiments, there may be more than one processing unit 21, such that the processor of computer 20 comprises a single central-processing unit (CPU), or a plurality of processing units, commonly referred to as a multi-processor or parallel-processing environment. In various embodiments, computer 20 may be implemented using a conventional computer, a distributed computer, or any other type of computer including those embedded in cell phones, personal-data-assistant devices or other form factors. For example, in some embodiments, computer 20 is implemented as any suitable computing device such as a desktop computer or a network of such computers, a laptop computer (e.g., a Macbook®), a tablet computer (e.g., an iPad®), a music and/or video-player computer (e.g., an iPod Touch®), a cell phone computer (e.g., an iPhone®), a smart television (one that can stream video programming from the internet), a video-streaming device (e.g., a Roku® or an AppleTV®) that obtains content from the internet and outputs the content to a conventional high-definition TV), a computer/MP3-player/CD-player/GPS/phone system in an automobile or other vehicle, or any other suitable personal-computing (PC) platform (although several Apple® products are listed as typical examples here since most persons of skill in the art can identify the type of device by analogy to such Apple® products, the products of any other manufacturer may be substituted).

The system bus 23 can be any of several types of bus structures including a memory bus or memory controller, a peripheral bus, and a local bus using any of a variety of bus architectures. The system memory can also be referred to as simply the memory, and includes read-only memory (ROM) 24 and random-access memory (RAM) 25. A basic input/output system (BIOS) 26, containing the basic routines that help to transfer information between elements within the computer (or server) 20, such as during start-up, may be stored in ROM 24. The computer 20 further includes a hard disk drive 27 for reading from and writing to a magnetic hard disk, a removable-media drive or FLASH controller 28 for reading from or writing to a removable magnetic floppy-disk or FLASH storage device 29, and an optical disk drive 30 for reading from or writing to a removable optical disk 31 (such as a CDROM, DVD, Blu-ray Disc™ (BD) or other optical media).

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non-volatile, non-ephemeral storage of computer-readable instructions, data structures, program modules and other data for the computer 20. It should be appreciated by those skilled in the art that any type of computer-readable media which can store data that is accessible by a computer, such as magnetic cassettes, FLASH memory cards, digital video disks, Bernoulli cartridges, random-access memories (RAMs), read-only memories (ROMs), redundant arrays of independent disks (e.g., RAID storage devices) and the like, can be used in the exemplary operating environment.

A plurality of program modules that implement the methods of the present invention (e.g., a functional fit or look-up table of array-detector-pixel values to measured throughput power) can be stored on the hard disk, magnetic or FLASH storage device 29, optical disk 31, ROM 24, or RAM 25, including an operating system 35, one or more application programs 36, other program modules 37, and program data 38. A plug-in program containing a security transmission engine for the present invention can be resident on any one, or on a plurality of these computer-readable media.

In some embodiments, a user enters commands into the computer 20 through input devices such as a keyboard 40, pointing device 42 or other suitable devices. These input devices are often connected to the processing unit 21 through a serial port interface 46 that is coupled to the system bus 23, but can be connected by other interfaces, such as a parallel port, game port, or a universal serial bus (USB); a monitor 47 or other type of display device can also be connected to the system bus 23 via an interface, such as a video adapter 48. The monitor 47 can display a graphical user interface for the audiologist and/or user. In addition to the monitor 47, computers typically include other peripheral output devices (not shown), such as speakers and printers.

In some embodiments, computer 20 operates in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above relative to the computer 20, although only memory storage device 50 and application programs 36 have been illustrated in FIG. 6. The logical connections depicted in FIG. 4 include local-area network (LAN) 51 and wide-area network (WAN) 52. Such networking environments are commonplace in office networks, enterprise-wide computer networks, intranets and the Internet, which are all types of networks.

When used in a local-area networking (LAN) environment, the computer 20 is connected to the LAN 51 through a network interface, modem or adapter 53, which is one type of communications device. When used in a wide-area networking (WAN) environment such as the internet, the computer 20 typically includes an adaptor or modem 54 (a type of communications device), or any other type of communications device, e.g., a wireless transceiver, for establishing communications over the wide area network 52, such as the internet. The modem 54, which may be internal or external, is connected to the system bus 23 via the serial port interface 46. In a networked environment, program modules depicted relative to the personal computer 20, or portions thereof, can be stored in the remote memory storage device 50 of remote computer (or server) 49 and accessed over the internet or other communications means. Note that the transitory signals on the internet may move stored program code from a non-transitory storage medium at one location to a computer that executes the code at another location by the signals on one or more networks. The program instructions and data structures obtained from a network or the internet are not "stored" on the network itself, but are stored in non-transitory storage media that may be connected to the internet from time to time for access. It is appreciated that the network connections shown are exemplary, and in some embodiments, other means of, and communications devices for, establishing a communications link between the computers may be used including hybrid fiber-coax connections, T1-T3 lines, DSL's, OC-3 and/or OC-12, TCP/IP, microwave, WAP (wireless application protocol), and all other electronic media through standard switches, routers, outlets and power lines, as the same are known and understood by one of ordinary skill in the art.

The hardware and operating environment in conjunction with which embodiments of the invention may be practiced has been described. The computer 20 in conjunction with which embodiments of the invention can be practiced can be a conventional computer, a distributed computer, or any other type of computer; the invention is not so limited. Such a computer 20 typically includes one or more processing units as its processor, and a computer-readable medium such as a memory. The computer 20 can also include a communications device such as a network adapter or a modem, so that it is able to communicatively couple to other computers, servers, or devices. In some embodiments, one or more parts of system 601 elicits and receives input from a user, and based on the input, modifies, adjusts or executes one or more of the methods of the present invention as described herein.

In some embodiments, the present invention uses a cleaved fiber launch for an interrupted power measurement system such as shown in FIG. 5C. In some embodiments, system 504 includes an optical-power head 585 (e.g., in some embodiments, the Ophir PD300-IRG Fiber Optic Power Meter Head by Ophir Optronics Solutions Ltd. (www.ophiropt.com/laser-measurement-instruments/new-products/pd300-r)) coupled to a cleaved fiber tip 510. In some embodiments, system 504 also includes neutral-density (ND) filters 530 and a camera 531. In some embodiments, the present invention provides an apparatus for measuring optical power that includes an optical fiber configured to propagate an optical signal, wherein the optical fiber includes a core and at least a first cladding layer, wherein a portion of the optical signal scatters out of the optical fiber along a length of the optical fiber to form scattered fiber light; a linear-array detector configured to receive the scattered fiber light along the length of the optical fiber and to output a detection signal based on the received scattered fiber light; and a processor configured to receive the detection signal and to determine a power value of the optical signal based on the received detection signal.

In some embodiments of the apparatus, the linear-array detector includes a plurality of imaging pixels arranged in a linear configuration along the length of the optical fiber. In some embodiments, the apparatus further includes imaging optics located in between the optical fiber and the linear-array detector, wherein the imaging optics is configured to direct the scattered fiber light onto the linear-array detector. In some embodiments, the apparatus further includes imaging optics located in between the optical fiber and the linear-array detector, wherein the imaging optics is configured to direct the scattered fiber light onto the linear-array detector, and wherein the imaging optics includes a lens.

In some embodiments of the apparatus, the scattered fiber light includes scattered pump light, the apparatus further comprising a wavelength filter configured to filter out the scattered pump light from the scattered fiber light before it reaches the linear-array detector.

In some embodiments, the apparatus further includes a housing configured to hold the linear-array detector fixed with respect to the optical fiber. In some embodiments, the optical fiber is a polarization-maintaining (PM) fiber, wherein a majority of the scattered fiber light scatters in a first direction from the PM fiber, wherein the linear-array detector is oriented to detect the scattered fiber light that scatters in the first direction. In some embodiments, the optical fiber is a polarization-maintaining (PM) fiber, wherein the processor includes a lock-in detection module, the apparatus further comprising a photoelastic modulator (or liquid-crystal device or the like) operatively coupled to the processor and configured to modulate the polarization of the scattered fiber light, wherein the processor controls the photoelastic modulator (or liquid-crystal device or the like) and the lock-in detection module in order to improve the signal-to-noise ratio of the scattered fiber light. In some embodiments, the processor is further configured to eliminate hot spots associated with the scattered fiber light during the determination of the power value of the optical signal.

In some embodiments, the processor is further configured to eliminate hot spots associated with the scattered fiber light during the determination of the power value of the optical signal, wherein the processor is further configured to perform a functional fit (or calibration table lookup) of the determined power value to the scattered fiber light, and wherein the functional fit (or calibration table lookup) is used to calculate the power value.

In some embodiments, the apparatus further includes a plurality of pump dumps; and a calibration power meter operatively coupled to an output end of the optical fiber, wherein the calibration power meter is configured to provide power calibration of the apparatus.

In some embodiments, the present invention provides a method for measuring optical power that includes providing an optical fiber configured to propagate an optical signal, wherein the optical fiber includes a core and at least a first cladding layer, wherein a portion of the optical signal scatters out of the optical fiber along a length of the optical fiber to form scattered fiber light; imaging, at a first time period, the scattered fiber light along the length of the optical fiber and outputting a first image signal based on the imaged scattered fiber light; and determining a power value of the optical signal based on the image signal.

In some embodiments, the method further includes focusing the scattered fiber light prior to the imaging of the scattered fiber light. In some embodiments, the method further includes wavelength filtering the scattered fiber light to separate the portion of the optical signal from pump light (or other background light (e.g., room light)). In some embodiments, the optical fiber is a polarization-maintaining (PM) fiber, wherein a majority of the scattered fiber light scatters in a first direction from the PM fiber, wherein the imaging of the scattered fiber light includes imaging the scattered fiber light that scatters in the first direction. In some embodiments, the optical fiber is a polarization-maintaining (PM) fiber, the method further comprising modulating the polarization of the scattered fiber light prior to the imaging of the scattered fiber light. In some embodiments, the determining of the power value of the optical signal includes eliminating hot spots associated with the scattered fiber light.

In some embodiments, the determining of the power value of the optical signal includes: eliminating hot spots associated with the scattered fiber light; performing a functional fit (or calibration table lookup) of the determined power value to the scattered fiber light; imaging, at a second time period, subsequent to the first time period, the scattered fiber light along the length of the optical fiber and outputting a second image signal and determining, using the functional fit (or calibration table lookup), a power value of the optical signal based on the second image signal.

In some embodiments, the method further includes dumping pump light along the length of the optical fiber; and calibrating the determining of the power value of the optical signal. In some embodiments, the method further includes shutting off generation of the optical signal if the determined power value is different than (e.g., above, below, and/or varies over time in a way that indicates a need for action) a predetermined level. In some embodiments, the method further includes stripping out cladding-mode power from the optical fiber prior to the imaging of the scattered fiber light.

In some embodiments, the present invention provides an apparatus that includes an optical fiber configured to propagate an optical signal, wherein the optical fiber includes a core and at least a first cladding layer, wherein a portion of the optical signal scatters out of the optical fiber along a length of the optical fiber to form scattered fiber light; means for imaging the scattered fiber light along the length of the optical fiber and outputting an image signal based on the imaged scattered fiber light; and means for determining a power value of the optical signal based on the image signal.

In some embodiments, the present invention provides a method for measuring optical power that includes providing an optical-scattering medium (e.g., solid-state laser gain media such as Nd:YAG or passive optical materials such as fused silica, BK-7 glass, water, air, or the like) configured to propagate an optical signal, wherein a portion of the optical signal scatters out of the optical-scattering medium along a length of the optical-scattering medium to form scattered light; imaging, at a first time period, the scattered light along the length of the optical-scattering medium and outputting a first image signal based on the imaged scattered light; and determining a power value of the optical signal based on the first image signal.

In some embodiments, the present invention provides an apparatus for measuring optical power that includes an optical fiber configured to propagate an optical signal, wherein the optical fiber includes a core and at least a first cladding layer, wherein a portion of the optical signal scatters out of the optical fiber along a length of the optical fiber to form scattered fiber light; a detector system configured to receive the scattered fiber light along the length of the optical fiber and to output a detection signal based on the received scattered fiber light; and a processor configured to receive the detection signal and to determine a power value of the optical signal based on the received detection signal.

In some embodiments of the apparatus, the first cladding layer has an index of refraction, wherein the optical fiber further includes a second cladding layer that surrounds the first cladding layer along the length of the optical fiber, and wherein the second cladding layer has a lower index of refraction than the index of refraction of the first cladding layer such that pump light inserted into the first cladding layer is contained within the first cladding layer along the length of the optical fiber. In some embodiments, the detector system includes a single-pixel detector.

In some embodiments of the apparatus, the detector system includes a plurality of light-sensing positions, wherein the plurality of light-sensing positions each collect light from at least one different location. In some such embodiments, the detector system includes a one-by-N linear-array detector, and wherein N is an integer larger than one. In some such embodiments, the detector system includes an M-by-N detector, wherein M and N are each an integer larger than one. In some embodiments, the detector system includes a plurality of single-pixel detectors.

In some embodiments of the apparatus, the scattered fiber light includes scattered pump light, the apparatus further including imaging optics located between the optical fiber and the detector system, wherein the imaging optics is configured to direct the scattered fiber light onto the detector system; and a wavelength filter configured to filter out the scattered pump light from the scattered fiber light before it reaches the detector system. In some embodiments, the optical fiber is a polarization-maintaining (PM) fiber, wherein a majority of the scattered fiber light scatters in a first direction from the PM fiber, wherein the detector system is oriented to detect the scattered fiber light that scatters in the first direction. In some embodiments, the optical fiber is a polarization-maintaining (PM) fiber, wherein the processor includes a lock-in detection module, the apparatus further includes a polarization modulator unit operatively coupled to the processor and configured to modulate a polarization of the scattered fiber light, wherein the polarization modulator unit includes a polarizer, wherein the processor controls the polarization modulator unit and the lock-in detection module in order to improve the signal-to-noise ratio of the scattered fiber light (e.g., in some embodiments, the lock-in detection module improves the detection of light scattered from the core over light scattered from any other part of the fiber). In some such embodiments, the polarization modulator unit includes a photoelastic modulator. In some such embodiments, the polarization modulator unit includes a liquid-crystal (LC) modulator. In some embodiments, the polarization modulator includes a variable retarder. In some embodiments, the polarization modulator is any other suitable polarization modulating device.

In some embodiments of the apparatus, the processor is further configured to eliminate hot spots associated with the scattered fiber light during the determination of the power value of the optical signal. In some embodiments, the apparatus further includes one or more pump dumps; and a calibration power meter optically coupled to the optical fiber, wherein the calibration power meter is configured to provide power calibration of the apparatus.

In some embodiments of the apparatus, the optical fiber further includes a second cladding layer that surrounds the first cladding layer along the length of the optical fiber. In some such embodiments, the second cladding layer has a low index of refraction such that pump light inserted into the first cladding layer is contained within the first cladding layer along the length of the optical fiber.

In some embodiments of the apparatus, the detector system includes a plurality of light-sensing positions, wherein the plurality of light-sensing positions each collect light from at least one different location, wherein the detector system includes a one-by-N linear-array detector, and wherein N is an integer larger than one. In some embodiments, the detector system includes a plurality of light-sensing positions, wherein the plurality of light-sensing positions each collect light from at least one different location, wherein the detector system includes an M-by-N detector, wherein M and N are each an integer larger than one. In some embodiments, the detector system includes a plurality of light-sensing positions, wherein the plurality of light-sensing positions each collect light from at least one different location, and wherein the detector system includes a single-pixel detector. In some embodiments, the detector system includes a single-pixel detector.

In some embodiments, the apparatus further includes imaging optics located between the optical fiber and the detector system, wherein the imaging optics is configured to direct the scattered fiber light onto the detector system. In some embodiments, the scattered fiber light includes scattered pump light, the apparatus further comprising a wavelength filter configured to filter out the scattered pump light from the scattered fiber light before it reaches the detector system.

In some embodiments, the apparatus further includes a housing configured to hold the detector system fixed with respect to the optical fiber. In some embodiments, the optical fiber is a polarization-maintaining (PM) fiber, wherein a majority of the scattered fiber light scatters in a first direction from the PM fiber, wherein the detector system is oriented to detect the scattered fiber light that scatters in the first direction. In some embodiments, the optical fiber is a polarization-maintaining (PM) fiber, wherein the processor includes a lock-in detection module, the apparatus further including a photoelastic modulator unit operatively coupled to the processor and configured to modulate a polarization of the scattered fiber light, wherein the photoelastic modulator unit includes a polarizer, wherein the processor controls the photoelastic modulator unit and the lock-in detection module in order to improve the signal-to-noise ratio of the scattered fiber light. In some embodiments, the optical fiber is a polarization-maintaining (PM) fiber, wherein the processor includes a lock-in detection module, the apparatus further including a liquid-crystal (LC) modulator unit operatively coupled to the processor and configured to modulate a polarization of the scattered fiber light, wherein the LC modulator unit includes a polarizer, wherein the processor controls the LC modulator unit and the lock-in detection module in order to improve the signal-to-noise ratio of the scattered fiber light.

In some embodiments of the apparatus, the processor is further configured to eliminate hot spots associated with the scattered fiber light during the determination of the power value of the optical signal. In some embodiments, the processor is further configured to eliminate hot spots associated with the scattered fiber light during the determination of the power value of the optical signal, wherein the processor is further configured to perform a functional fit of the determined power value to the scattered fiber light. In some embodiments, the apparatus further includes a plurality of pump dumps; and a calibration power meter configured to be temporarily coupled to an output end of the optical fiber, wherein the calibration power meter is configured to provide power calibration of the apparatus. In some embodiments, the apparatus further includes a plurality of pump dumps; and a calibration power meter optically coupled to an output end of the optical fiber such that free space is located between the output end of the optical fiber and the calibration power meter, wherein the calibration power meter is configured to provide power calibration of the apparatus.

In some embodiments, the present invention provides a method for measuring optical power that includes providing an optical fiber configured to propagate an optical signal, wherein the optical fiber includes a core and at least a first cladding layer, wherein a portion of the optical signal scatters out of the optical fiber along a length of the optical fiber to form scattered fiber light; detecting, at a first time period, the scattered fiber light along the length of the optical fiber and outputting a first signal based on the imaged scattered fiber light; and determining a power value of the optical signal based on the first signal.

In some embodiments of the method, the detecting includes imaging the scattered fiber light along the length of the optical fiber. In some embodiments, the scattered fiber light includes scattered pump light, the method further including focusing the scattered fiber light prior to the detecting of the scattered fiber light; and wavelength filtering the scattered fiber light to separate the portion of the optical signal from pump light.

In some embodiments of the method, the optical fiber is a polarization-maintaining (PM) fiber, wherein a majority of the scattered fiber light scatters in a first direction from the PM fiber, and wherein the detecting of the scattered fiber light includes detecting the scattered fiber light that scatters in the first direction by lock-in detection, the method further including modulating a polarization of the scattered fiber light prior to the detecting of the scattered fiber light.

In some embodiments of the method, the determining of the power value of the optical signal includes eliminating hot spots associated with the scattered fiber light. In some embodiments, the determining of the power value of the optical signal includes eliminating hot spots associated with the scattered fiber light; performing a functional fit of the determined power value to the scattered fiber light; detecting, at a second time period, subsequent to the first time period, the scattered fiber light along the length of the optical fiber and outputting a second image signal; and determining, using the functional fit, a power value of the optical signal based on the second image signal.

In some embodiments, the method further includes dumping pump light along the length of the optical fiber; and calibrating the determining of the power value of the optical signal. In some embodiments, the method further includes providing a detector system configured to perform the detecting; and fixing a position of the detector system with respect to the optical fiber. In some embodiments, the determining of the power value of the optical signal includes detecting a power-versus-time profile of the optical signal. In some embodiments, the method further includes controlling the optical signal based at least in part on the power-versus-time profile (e.g. in some embodiments, the power-versus-time profile is used as part of a feedback system to the optical signal generator/controller such that the optical-signal generator/controller uses the power-versus-time profile to maintain constant optical power, shut down power if the power signal meets certain profile criteria, and/or the like).

In some embodiments of the method, the optical fiber further includes a second cladding layer that surrounds the first cladding layer along the length of the optical fiber. In some such embodiments, the second cladding layer has a low index of refraction such that pump light inserted into the first cladding layer is contained within the first cladding layer along the length of the optical fiber.

In some embodiments of the method, the detecting includes imaging the scattered fiber light along the length of the optical fiber. In some embodiments, the method further includes focusing the scattered fiber light prior to the detecting of the scattered fiber light. In some embodiments, the method further includes wavelength filtering the scattered fiber light to separate the portion of the optical signal from pump light. In some embodiments, the optical fiber is a polarization-maintaining (PM) fiber, wherein a majority of the scattered fiber light scatters in a first direction from the PM fiber, and wherein the detecting of the scattered fiber light includes detecting the scattered fiber light that scatters in the first direction. In some embodiments, the optical fiber is a polarization-maintaining (PM) fiber, the method further including modulating a polarization of the scattered fiber light prior to the detecting of the scattered fiber light. In some embodiments, the determining of the power value of the optical signal includes eliminating hot spots associated with the scattered fiber light. In some embodiments, the determining of the power value of the optical signal includes eliminating hot spots associated with the scattered fiber light; performing a functional fit of the determined power value to the scattered fiber light; detecting, at a second time period, subsequent to the first time period, the scattered fiber light along the length of the optical fiber and outputting a second image signal; and determining, using the functional fit, a power value of the optical signal based on the second image signal.

In some embodiments, the method further includes dumping pump light along the length of the optical fiber; and calibrating the determining of the power value of the optical signal. In some embodiments, the determining of the power value includes monitoring the power value of the optical signal over a plurality of time periods including the first time period. In some embodiments, the method further includes controlling generation of the optical signal (e.g., shutting off generation, maintaining generation rate, adjusting generation rate, and the like) based at least in part on the monitored power value (in some such embodiments, the monitored power value is transmitted (in some embodiments, via a wired connection; in other embodiments, via a wireless connection) to the optical signal generator/controller as part of a feedback system). In some embodiments, the monitoring includes detecting a time-versus-power profile of the optical signal. In some embodiments, the method further includes adjusting a temperature of the optical fiber based at least in part on the monitored power value. In some embodiments, the method further includes stripping out cladding-mode power from the optical fiber prior to the detecting of the scattered fiber light.

In some embodiments, the present invention provides an apparatus that includes an optical fiber configured to propagate an optical signal, wherein the optical fiber includes a core and at least a first cladding layer, wherein a portion of the optical signal scatters out of the optical fiber along a length of the optical fiber to form scattered fiber light; means for detecting the scattered fiber light along the length of the optical fiber and outputting a signal based on the imaged scattered fiber light; and means for determining a power value of the optical signal based on the image signal.

In some embodiments, the present invention provides a non-transitory computer-readable medium containing instructions stored thereon for causing a suitably programmed information processor to execute a method for determining optical power in an optical fiber based on signals received from a detector, wherein the optical fiber includes a core and at least a first cladding layer, wherein a portion of the optical signal scatters out of the optical fiber along a length of the optical fiber to form scattered fiber light, wherein the portion of the optical signal that scatters out of the optical fiber is detected by the detector, and wherein the computer-readable medium includes: instructions for receiving a first signal from the detector, wherein the first signal is based on scattered light detected from along the length of the optical fiber during a first time period; instructions for calculating a power value based on the first signal that represents scattered fiber light; and instructions for outputting the calculated power value of the optical signal.

Some embodiments of the computer-readable medium include a table of calibration values used to calibrate the power signal.

Some embodiments of the computer-readable medium further include instructions for causing imaging of the scattered fiber light along the length of the optical fiber. In some embodiments, the scattered fiber light includes scattered pump light, the computer-readable medium further including instructions for causing the focusing of the scattered fiber light prior to the detecting of the scattered fiber light; and instructions for causing wavelength filtering of the scattered fiber light to separate the portion of the optical signal from pump light.

In some embodiments of the computer-readable medium, the optical fiber is a polarization-maintaining (PM) fiber, wherein a majority of the scattered fiber light scatters in a first direction from the PM fiber, and wherein the detecting of the scattered fiber light includes detecting the scattered fiber light that scatters in the first direction by lock-in detection, the computer-readable medium further including instructions for modulating a polarization of the scattered fiber light prior to the detecting of the scattered fiber light.

Some embodiments of the computer-readable medium further include instructions such that the determining of the power value of the optical signal includes eliminating hot spots associated with the scattered fiber light. In some embodiments, the computer-readable medium further include instructions such that the determining of the power value of the optical signal includes eliminating hot spots associated with the scattered fiber light; performing a functional fit of the determined power value to the scattered fiber light; detecting, at a second time period, subsequent to the first time period, the scattered fiber light along the length of the optical fiber and outputting a second image signal; and determining, using the functional fit, a power value of the optical signal based on the second image signal.

Some embodiments of the computer-readable medium further include instructions for causing dumping of pump light along the length of the optical fiber; and calibrating the determining of the power value of the optical signal. In some embodiments, a detector system configured to perform the detecting is provided; and a position of the detector system is fixed with respect to the optical fiber. In some embodiments, the computer-readable medium further includes instructions such that the determining of the power value of the optical signal includes detecting a power-versus-time profile of the optical signal. In some embodiments, the computer-readable medium further include instructions for controlling the optical signal based at least in part on the power-versus-time profile (e.g. in some embodiments, the power-versus-time profile is used as part of a feedback system to the optical signal generator/controller such that the optical-signal generator/controller uses the power-versus-time profile to maintain constant optical power, shut down power if the power signal meets certain profile criteria, and/or the like).

In some embodiments of the computer-readable medium, the optical fiber further includes a second cladding layer that surrounds the first cladding layer along the length of the optical fiber. In some such embodiments, the second cladding layer has a low index of refraction such that pump light inserted into the first cladding layer is contained within the first cladding layer along the length of the optical fiber.

Some embodiments of the computer-readable medium further include instructions such that the detecting includes imaging the scattered fiber light along the length of the optical fiber. In some embodiments, the computer-readable medium further includes instructions for causing the focusing of the scattered fiber light prior to the detecting of the scattered fiber light. In some embodiments, the computer-readable medium further includes instructions for causing wavelength filtering of the scattered fiber light to separate the portion of the optical signal from pump light. In some embodiments, the optical fiber is a polarization-maintaining (PM) fiber, wherein a majority of the scattered fiber light scatters in a first direction from the PM fiber, and wherein the computer-readable medium further includes instructions such that the detecting of the scattered fiber light includes detecting the scattered fiber light that scatters in the first direction. In some embodiments, the optical fiber is a polarization-maintaining (PM) fiber, the computer-readable medium further including instructions for causing the modulating of a polarization of the scattered fiber light prior to the detecting of the scattered fiber light. In some embodiments of the computer-readable medium, the determining of the power value of the optical signal includes eliminating hot spots associated with the scattered fiber light. In some embodiments, the computer-readable medium further includes instructions such that the determining of the power value of the optical signal includes eliminating hot spots associated with the scattered fiber light; performing a functional fit of the determined power value to the scattered fiber light; detecting, at a second time period, subsequent to the first time period, the scattered fiber light along the length of the optical fiber and outputting a second image signal; and determining, using the functional fit, a power value of the optical signal based on the second image signal.

Some embodiments of the computer-readable medium further include instructions for causing dumping of pump light along the length of the optical fiber; and for calibrating the determining of the power value of the optical signal. In some embodiments, the determining of the power value includes monitoring the power value of the optical signal over a plurality of time periods including the first time period. In some embodiments, the computer-readable medium further includes instructions for causing the controlling of the generation of the optical signal (e.g., shutting off generation, maintaining generation rate, adjusting generation rate, and the like) based at least in part on the monitored power value (in some such embodiments, the monitored power value is transmitted (in some embodiments, via a wired connection; in other embodiments, via a wireless connection) to the optical signal generator/controller as part of a feedback system). In some embodiments, the monitoring includes detecting a time-versus-power profile of the optical signal. In some embodiments, the computer-readable medium further includes instructions for causing the adjusting of a temperature of the optical fiber based at least in part on the monitored power value. In some embodiments, the computer-readable medium further includes instructions for causing the stripping out of cladding-mode power from the optical fiber prior to the detecting of the scattered fiber light.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and patent-application publications incorporated by reference in the present application). Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus for measuring optical power comprising:
   an optical fiber configured to propagate an optical signal, wherein the optical fiber includes a core and at least a first cladding layer, wherein a portion of the optical signal scatters out of the optical fiber along a length of the optical fiber to form scattered fiber light;
   a detector system configured to receive the scattered fiber light along the length of the optical fiber and to output a detection signal based on the received scattered fiber light;
   a processor configured to receive the detection signal and to determine a power value of the optical signal based on the received detection signal; and
   a polarization modulator unit located between the optical fiber and the detector system and operatively coupled to the processor, wherein the polarization modulator unit is configured to modify an intensity of the scattered fiber light after the scattered fiber light has exited the optical fiber and before the scattered fiber light reaches the detector system.

2. The apparatus of claim 1, wherein the first cladding layer has an index of refraction, wherein the optical fiber further includes a second cladding layer that surrounds the first cladding layer along the length of the optical fiber, and wherein the second cladding layer has a lower index of refraction than the index of refraction of the first cladding layer such that pump light inserted into the first cladding layer is contained within the first cladding layer along the length of the optical fiber.

3. The apparatus of claim 1, wherein the detector system includes a plurality of light-sensing positions, and wherein the plurality of light-sensing positions each collect light from at least one different location.

4. The apparatus of claim 3, wherein the detector system includes a one-by-N linear-array detector, and wherein N is an integer larger than one.

5. The apparatus of claim 1, wherein the detector system includes a single-pixel detector.

6. The apparatus of claim 1, wherein the scattered fiber light includes scattered pump light, the apparatus further comprising:
   imaging optics located between the optical fiber and the detector system, wherein the imaging optics is configured to direct the scattered fiber light onto the detector system; and
   a wavelength filter configured to filter out the scattered pump light from the scattered fiber light before it reaches the detector system.

7. The apparatus of claim 1, wherein the optical signal propagates through the optical fiber in a core-signal-light propagation direction, wherein the optical fiber is a polarization-maintaining (PM) fiber that provides a polarization-electric-field direction, and wherein the detector system is oriented to detect a portion of the scattered fiber light that scatters out of the optical fiber in a direction that is perpendicular to both the polarization-electric-field direction and the core-signal-light propagation direction.

8. The apparatus of claim 1, wherein the optical signal propagates through the optical fiber in a core-signal-light propagation direction, wherein the optical fiber is a polarization-maintaining (PM) fiber that provides a polarization-electric-field direction, wherein the processor includes a lock-in detection module, wherein the polarization modulator unit includes a polarizer, wherein the polarization modulator unit is arranged to receive a portion of the scattered fiber light that scatters out of the optical fiber in a direction that is perpendicular to both the polarization-electric-field direction and the core-signal-light propagation direction, and wherein the processor controls the polarization modulator unit and the lock-in detection module in order to improve the signal-to-noise ratio of the scattered fiber light received by the detector.

9. The apparatus of claim 1, wherein the processor is further configured to data filter light-intensity defects along the length of the optical fiber associated with the scattered fiber light during the determination of the power value of the optical signal.

10. The apparatus of claim 1, further comprising:
    a pump dump; and
    a calibration power meter optically coupled to the optical fiber, wherein the calibration power meter is configured to provide power calibration of the apparatus.

11. An apparatus comprising:
    an optical fiber configured to propagate an optical signal, wherein the optical fiber includes a core and at least a first cladding layer, wherein a portion of the optical signal scatters out of the optical fiber along a length of the optical fiber to form scattered fiber light;
    means for detecting the scattered fiber light along the length of the optical fiber and outputting a signal based on the imaged scattered fiber light;
    means for determining a power value of the optical signal based on the image signal;
    means for modifying an intensity of the scattered fiber light after the scattered fiber light has exited the optical fiber and before the scattered fiber light reaches the means for detecting, wherein the means for modifying is located between the optical fiber and the means for detecting, and wherein the means for determining the power value is operatively coupled to the means for modifying.

12. The apparatus of claim 1,
wherein the detector system further includes:
- a receiver module that is configured:
  - to receive, at a first time period, the scattered fiber light along the length of the optical fiber and output a first detection signal based on the scattered fiber light received during the first time period, and
  - to receive, at a second time period, subsequent to the first time period, the scattered fiber light along the length of the optical fiber and to output a second detection signal based on the scattered fiber light received during the second time period,
wherein the processor further includes:
- a power module that is configured:
  - to receive the first detection signal,
  - to determine a first power value of the optical signal based on the received first detection signal,
  - to perform a functional fit of the determined first power value to the scattered fiber light, and
  - to determine a second power value of the optical signal based on the functional fit and on the second detection signal.

13. The apparatus of claim 1, wherein a position of the detector system is fixed relative to the optical fiber.

14. The apparatus of claim 1, wherein the processor is further configured to determine a power-versus-time profile of the optical signal.

15. An apparatus for measuring optical power comprising:
- an optical fiber configured to propagate an optical signal, wherein the optical fiber includes a core and at least a first cladding layer, wherein a portion of the optical signal scatters out of the optical fiber along a length of the optical fiber to form scattered fiber light;
- a detector system configured to receive the scattered fiber light along the length of the optical fiber and to output a detection signal based on the received scattered fiber light;
- a processor configured to receive the detection signal and to determine a power value of the optical signal based on the received detection signal, wherein the processor is further configured to determine a power-versus-time profile of the optical signal;
- a polarization modulator unit located between the optical fiber and the detector system and operatively coupled to the processor, wherein the polarization modulator unit is configured to modify an intensity of the scattered fiber light after the scattered fiber light has exited the optical fiber and before the scattered fiber light reaches the detector system; and
- a controller configured to control the optical signal based at least in part on the determined power-versus-time profile.

16. The apparatus of claim 11, wherein the scattered fiber light includes scattered pump light, the apparatus further comprising:
- means for focusing the scattered fiber light prior to detecting the scattered fiber light; and
- means for wavelength filtering the scattered fiber light to separate the portion of the optical signal from pump light.

17. The apparatus of claim 11, wherein the optical signal propagates through the optical fiber in a core-signal-light propagation direction, wherein the optical fiber is a polarization-maintaining (PM) fiber that provides a polarization-electric-field direction, and wherein the means for detecting is oriented to detect a portion of the scattered fiber light that scatters out of the optical fiber in a direction that is perpendicular to both the polarization-electric-field direction and the core-signal-light propagation direction.

18. The apparatus of claim 11, further comprising:
- means for dumping pump light along the length of the optical fiber; and
- means for calibrating the determining of the power value of the optical signal.

19. The apparatus of claim 11, wherein the means for detecting is in a fixed positional relationship to the optical fiber.

20. The apparatus of claim 11, further comprising:
- means for determining a power-versus-time profile of the optical signal; and
- means for controlling the optical signal based at least in part on the determined power-versus-time profile.

* * * * *